(12) United States Patent
Fuetterling

(10) Patent No.: US 10,482,650 B2
(45) Date of Patent: Nov. 19, 2019

(54) METHODS, COMPUTER PROGRAM AND APPARATUS FOR AN ORDERED TRAVERSAL OF A SUBSET OF NODES OF A TREE STRUCTURE AND FOR DETERMINING AN OCCLUSION OF A POINT ALONG A RAY IN A RAYTRACING SCENE

(71) Applicant: Fraunhofer-Gesellschaft zur Foerderung der angewandten Forschung e.V., Munich (DE)

(72) Inventor: Valentin Fuetterling, Kaiserslautern (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 86 days.

(21) Appl. No.: 15/814,441

(22) Filed: Nov. 16, 2017

(65) Prior Publication Data
US 2019/0035138 A1 Jan. 31, 2019

Related U.S. Application Data

(60) Provisional application No. 62/537,487, filed on Jul. 27, 2017.

(51) Int. Cl.
  *G06T 15/00* (2011.01)
  *G06T 15/06* (2011.01)
  *G06T 17/00* (2006.01)
(52) U.S. Cl.
  CPC ............ *G06T 15/06* (2013.01); *G06T 15/005* (2013.01); *G06T 17/005* (2013.01);
  (Continued)

(58) Field of Classification Search
  CPC ..... G06T 15/06; G06T 15/005; G06T 17/005; G06T 2200/28; G06T 2210/12; G06T 2210/52
  (Continued)

(56) References Cited

PUBLICATIONS

Barringer, R. and Akenine-Möller, T., 2014. Dynamic ray stream traversal. ACM Transactions on Graphics (TOG), 33(4), p. 151.*

(Continued)

*Primary Examiner* — Phu K Nguyen
(74) *Attorney, Agent, or Firm* — 2SPL Patent Attorneys PartG mbB; Kieran O'Leary

(57) ABSTRACT

Examples relate to methods, a computer program and an apparatus for an ordered traversal of a subset of nodes of a tree structure and/or for determining an occlusion of a point along a ray in a raytracing scene. The method for the ordered traversal of the subset of nodes of the tree structure comprises obtaining ordering information indicating a desired order of the ordered traversal of the tree structure. The method further comprises selecting a predetermined ordering parameter template from a plurality of predetermined ordering parameter templates based on the ordering information. The method further comprises copying the subset of nodes of the tree structure from a first memory region to a second memory region using a single processor operation of a vector processing processor instruction set such that the subset of nodes of the tree structure is stored within the second memory region in the desired order. The selected predetermined ordering parameter template is used as a parameter for the single processor operation.

20 Claims, 8 Drawing Sheets

(52) U.S. Cl.
CPC ...... *G06T 2200/28* (2013.01); *G06T 2210/12* (2013.01); *G06T 2210/52* (2013.01)

(58) Field of Classification Search
USPC .......................................................... 345/418
See application file for complete search history.

(56) References Cited

PUBLICATIONS

Fuetterling V, Lojewski C, Pfreundt FJ, Hamann B, Ebert A. Accelerated single ray tracing for wide vector units. InProceedings of High Performance Graphics Jul. 28, 2017 (p. 6). ACM.*

Fuetterling, Valentin, Carsten Lojewski, Franz-Josef Pfreundt, and Achim Ebert. "Efficient ray tracing kernels for modern CPU architectures." Journal of Computer Graphics Techniques (JCGT) 4, No. 4 (2015).*

Intel AVX-512 instruction set. https://software.intel.com/en-us/blogs/2013/avx-512-instructions. (????) Accessed: Apr. 21, 2017.

Timo Aila and Samuli Laine. 2009. Understanding the efficiency of ray traversal on GPUs, Proceedings of the 1st ACM conference on High Performance Graphics HPG 09 (2009), 145. DOI : https://doi.org/10.1145/1572769.1572792.

Rasmus Barringer and Tomas Akenine-Möller. 2014, Dynamic Ray Stream Traversal. ACM Transactions on Graphics 33, 4 (2014), 9. DOI : https://doi.org/10.1145/2601097.2601222.

Carsten Benthin, Ingo Wald, Sven Woop, Manfred Ernst, and William R. Mark. 2012. Combining single and packet-ray tracing for arbitrary ray distributions on the intel MIC architecture. IEEE Transactions on Visualization and Computer Graphics 18 (2012), 1438-1448. DOI : https://doi.org/10.1109/TVCG.2011.277.

Solomon Boulos, Dave Edwards, J. Dylan Lacewell, Joe Kniss, Jan Kautz, Peter Shirley, and Ingo Wald. 2007, Packet-Based Whitted and Distribution Ray Tracing. Proceedings of Graphics Interface 2007 (2007), 177-184. DOI : https://doi.org/10.1145/1268517.1268547.

Solomon Boulos, Ingo Wald, and Peter Shirley, 2006. Geometric and arithmetic culling methods for entire ray packets, University of Utah (2006). http://www.cs.utah.edu/.

Holger Dammertz, Johannes Hanika, and Alexander Keller. 2008, Shallow bounding volume hierarchies for fast SIMD ray tracing of incoherent rays. Computer Graphics Forum 27 (2008), 1225-1233, DOI : https://doi.,org/10.1111/j.1467-8659.2008.01261.X.

Manfred Ernst and Gunther Greiner. 2008. Multi bounding volume hierarchies. RT'08—IEEE/EG Symposium on Interactive Ray Tracing 2008, Proceedings (2008), 35-40. DOI : https://doi.org/10.1109/RT.2008.4634618.

Valentin Fuetterling, Carsten Lojewski, Franz-Josef Pfreundt, and Achim Ebert. 2015. Efficient Ray Tracing Kernels for Modern CPU Architectures. Journal of Computer Graphics Techniques (JCGT) 4, 4 (2015), 89-109.

Jeffrey Goldsmith and John Salmon. 1987. Automatic Creation of Object Hierarchies for Ray Tracing. (1987). DOI : https://doi.org/10.1109/MCG.1987.276983.

Christiaan Gribble. 2016. Node Culling Multi-hit BVH Traversal. In Proceedings of the Eurographics Symposium on Rendering: Experimental Ideas & Implementations (EGSR '16), Eurographics Association, Goslar Germany, Germany, 85-90. DOI: https://doi.org/10.2312/sre.20161213 arXiv:arXiv:1011.1669v3.

Christiaan Gribble, Alexis Naveros, and Ethan Kerzner. 2014. Multi-Hit Ray Traversal. Journal of Computer Graphics Techniques (JCGT) 3, 1 (Feb. 2014), 1-17. http://jcgt.org/published/0003/01/01/.

James T. Kajiya and Timothy L, Kay. 1986. Ray Tracing Complex Scenes. ACM SIGGRAPH Computer Graphics 20, 4 (1986), 269-278. DOI : https://doi.org/10.1145/15886.15916.

Jeffrey Mahovsky. 2005. Ray Tracing with Reduced-Precision Bounding Volume Hierarchies, Ph.D. Dissertation. University of Calgary.

Shinji Ogaki and Alexandre Derouet-jourdan. 2016. An N-ary BVH Child Node Sorting Technique for Occlusion Tests. journal ofComputer Graphics Techniques (7CGT) 5, 2 (2016), 22-37.

Steven G, Parker, James Bigler, Andreas Dietrich, Heiko Friedrich, Jared Hoberock, David Luebke, David Mcallister, and Martin Stich. 2010, OptiX: A general purpose ray tracing engine. ACM Transactions on Graphics TOG 29, 4 (2010), 1-13. DOI: https://doi.org/10.1145/1833349.1778803.

Martin Stich, Heiko Friedrich, and Andreas Dietrich. 2009, Spatial Splits in Bounding Volume Hierarchies. Proceedings of the Conference on High Performance Graphics 2009 (HPG'09) (2009), 7-14. DOI : https://doi.org/10.1145/1572769.1572771.

Ja Tsakok, 2009. Faster incoherent rays: Multi-BVH ray stream tracing. Proceedings of the Conference on High Performance Graphics 2009 (HPG'09) (2009), 151-158, DOI : https://doi.org/10.1145/1572769.1572793.

Ingo Wald. 2007. On fast construction of SAH-based bounding volume hierarchies. IEEE/ EG Symposium on Interactive Ray Tracing 2007 Proceedings, IRT 1 (2007), 33-40, DOI : https://doi.org/10.1109/RT.2007.4342588.

Ingo Wald, Carsten Benthin, and Solomon Boulos. 2008. Getting rid of packets—Efficient SIMD single-ray traversal using multi-branching BVHs. RT'08—IEEE/EG Symposium on Interactive Ray Tracing 2008, Proceedings (2008), 49-57. DOI: https://doi.org/10.1109/RT.2008.4634620.

Ingo Wald, Solomon Boulos, and Peter Shirley. 2007, Ray tracing deformable scenes using dynamic bounding volume hierarchies. ACM Transactions on Graphics 26, 1 (2007), 1-10. DOI : https://doi.org/10.1145/1186644.186650.

Ingo Wald, Thiago Ize, and Steven G. Parker. 2008. Fast, parallel, and asynchronous construction of BVHs for ray tracing animated scenes. Computers and Graphics (Pergamon) 32, Dec. 2008, 3-13. DOI : https://doi.org/10.1016/j.cag.2007.11.004.

Ingo Wald, Philipp Slusallek, Carsten Benthin, and Markus Wagner. 2001. Interactive Rendering with Coherent Ray Tracing, Computer Graphics Forum 20, 3 (2001), 153-165. DOI : https://doi.org/10.1111/1467-8659.00508.

Ingo Wald, Sven Woop, Carsten Benthin, Gregory S. Johnson, and Manfred Ernst. 2014. Embree: A Kernel Framework for EflYlcient CPU Ray Tracing, ACM Transactions on Graphics 33, 4 (2014). DOI : https://doi.org/10.1145/2601097.2601199.

Attila T. Afra and Laszlo Szirmay-Kalos. 2014. Stackless Multi-BVH Traversal for CPU, MIC and GPU Ray Tracing. Computer Graphics Forum 33, 1 (2014), 129-140. DOI: https://doi.org/10.1111/cgf.12259.

Rob Farber. 2017. Redefining HPC Visualization Using CPUs. (2017). http://www.hpctoday.com/state-of-the-art/redefining-hpc-visualization-using-cpus.

Tomas Moeller and Ben Trumbore. 1997, Fast, Minimum Storage Ray-triangle Intersection. J. Graph. Tools 2, 1 (Oct. 1997), 21-28, DOI: https://doi.org/10.1080/10867651.1997.10487468.

* cited by examiner

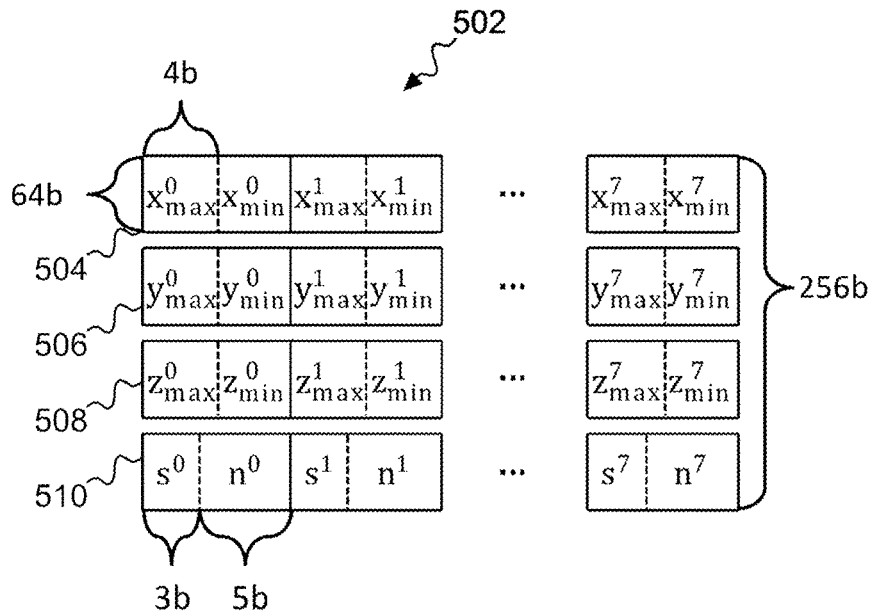
FIG. 5A
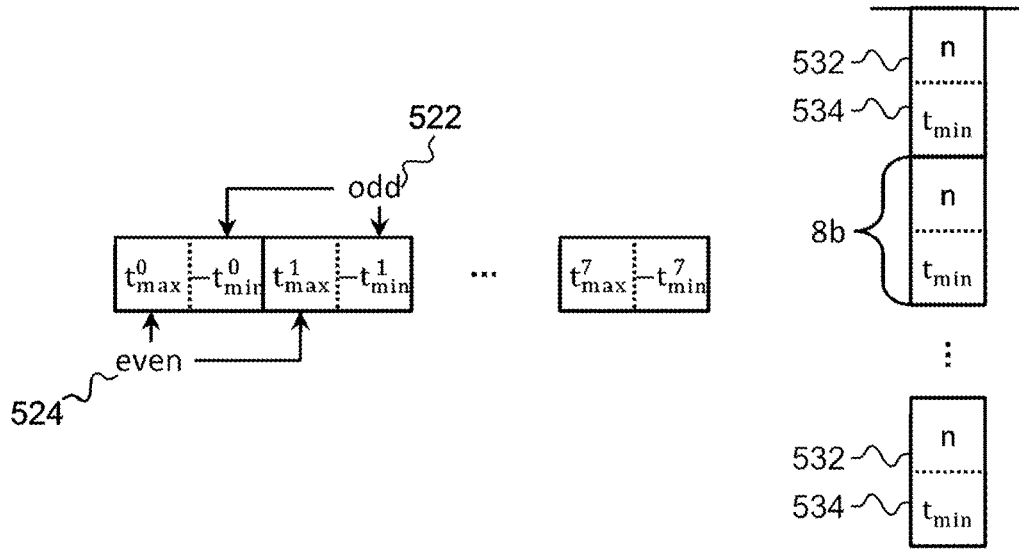
FIG. 5B
FIG. 5C

|            | Inner Nodes | Leaves | Triangles | Inner Nodes | Leaves | Triangles | Inner Nodes | Leaves | Triangles |
|------------|-------------|--------|-----------|-------------|--------|-----------|-------------|--------|-----------|
| Mazda      | 15,1        | 3,6    | 3,9       | 15,1        | 3,6    | 3,9       | 9,8         | 2,2    | 2,9       |
| San Miguel | 21,5        | 4,8    | 5,1       | 21,4        | 4,5    | 4,8       | 21,1        | 4,3    | 5,2       |
| Art Deco   | 11,5        | 2,4    | 2,7       | 11,5        | 2,3    | 2,6       | 10,8        | 2,2    | 2,7       |
| Powerplant | 19,5        | 4,8    | 9,0       | 19,5        | 4,8    | 8,9       | 16,0        | 4,5    | 7,5       |
| Villa      | 18,7        | 4,7    | 5,2       | 18,6        | 4,6    | 5,2       | 11,4        | 3,0    | 3,6       |

FIG. 6A

|                | Mazda | San Miguel | Art Deco | Powerplant | Villa |
|----------------|-------|------------|----------|------------|-------|
| # triangles[M] | 5,7   | 10,5       | 10,7     | 12,8       | 37,5  |
| WiVe       | 127.0 | 77.2 | 167.4 | 94.7 | 84.4 |
| Reference      | 93.1  | 57.1       | 123.0    | 56.0       | 66.6  |
| WiVe[+%]   | 36 | 35    | 36   | 69     | 27 |
| Embree         | 110.0 | 63.2       | 143.4    | 68.4       | 76.3  |
| WiVe[+%]   | 15 | 22    | 17   | 38     | 11 |
| OptiX          | 83.8  | 42.6       | 95.3     | 69.0       | 44.3  |
| WiVe[+%]   | 52 | 81    | 76   | 37     | 91 |

FIG. 6B

|            | 0  | 1  | 2  | 3  | >3 |
|------------|----|----|----|----|----|
| Mazda      | 23 | 43 | 20 | 8  | 6  |
| San Miguel | 26 | 35 | 22 | 10 | 7  |
| Art Deco   | 28 | 39 | 17 | 9  | 7  |
| Powerplant | 34 | 30 | 16 | 10 | 10 |
| Villa      | 24 | 38 | 21 | 10 | 7  |

FIG. 6C

|                     | Mazda | San Miguel | Art Deco | Powerplant | Villa |
|---------------------|-------|------------|----------|------------|-------|
| # triangles[M]      | 5,7   | 10,5       | 10,7     | 12,8       | 37,5  |
| WiVe Packet     | 577,0 | 540,0 | 802,0 | 461,0 | 345,0 |
| Culling[%]          | 73,0  | 82,0       | 82,0     | 78,0       | 76,0  |
| Embree              | 276,0 | 220,0      | 408,0    | 212,0      | 184,0 |
| WiVe Packet[+%] | 109,0 | 145,0 | 97,0 | 117,0 | 88,0 |

FIG. 6D

|             | Inner Nodes | Leaves | Inner Nodes | Leaves |
|-------------|-------------|--------|-------------|--------|
| Mazda       | 4,84        | 2,10   | 4,20        | 2,20   |
| San Miguel  | 4,25        | 1,79   | 4,02        | 1,91   |
| Art Deco    | 4,86        | 2,59   | 4,50        | 2,70   |
| Powerplant  | 6,35        | 4,14   | 5,82        | 4,15   |
| Villa       | 22,60       | 14,00  | 20,70       | 15,70  |

FIG. 6E

METHODS, COMPUTER PROGRAM AND APPARATUS FOR AN ORDERED TRAVERSAL OF A SUBSET OF NODES OF A TREE STRUCTURE AND FOR DETERMINING AN OCCLUSION OF A POINT ALONG A RAY IN A RAYTRACING SCENE

FIELD

Examples relate to methods, a computer program and an apparatus for an ordered traversal of a subset of nodes of a tree structure and/or for determining an occlusion of a point along a ray in a raytracing scene, more specifically, but not exclusively, based on using a single processor operation of a vector processing processor instruction set such that the subset of nodes of the tree structure is copied to a memory region in the desired order.

BACKGROUND

In ray tracing algorithms, one major focus is the calculation of occlusion of a point along a line in a space, which contains an amount of geometrical objects. The result of a calculation of occlusion is the answer to the question "is there an occlusion by one or several objects, and if so, which of these objects is closest to the point". In some cases, the calculation of occlusion may be accelerated by the use of a data structure for a spatial arrangement of the objects. For example, some systems may use a hierarchy of bounding volumes (Bounding Volume Hierarchy), wherein cuboids may be used as bounding volumes. A bounding volume may be also referred to as a node (e.g. of the subset of nodes). A node may further be specified as a branch or as a leaf, depending on whether it directly includes further nodes or one or several objects. With respect to one selected node, those nodes may be referred to as children which are arranged directly below the selected node in the hierarchy.

SUMMARY

Examples provide a method for an ordered traversal of a subset of nodes of a tree structure. The method comprises obtaining ordering information indicating a desired order of the ordered traversal of the tree structure. The method further comprises selecting a predetermined ordering parameter template from a plurality of predetermined ordering parameter templates based on the ordering information. The method further comprises copying the subset of nodes of the tree structure from a first memory region to a second memory region using a single processor operation of a vector processing processor instruction set such that the subset of nodes of the tree structure is stored within the second memory region in the desired order. The selected predetermined ordering parameter template is used as a parameter for the single processor operation.

Using predetermined ordering parameter templates, which are selected based on a desired ordering of the subset of nodes, as parameter for a vector copy operation, may enable a sorted copying of the subset of nodes with a single processor operation.

In various examples, the information indicating the desired order of the ordered traversal of the tree structure may indicate or comprise a query order index. The predetermined parameter template assigned to the desired order of the ordered traversal of the tree structure may be retrieved using the query order index of said desired order. For example, the query order index may be used to determine a section of the memory the corresponding predetermined parameter template is stored at, e.g. by calculating a memory offset or by deducing a register number.

In at least some examples, the ordering information may indicate k binary ordering parameters related to k degrees of freedom for the order of the tree structure. The selecting may select the corresponding predetermined ordering parameter template from a plurality of k! predetermined ordering parameter templates. The k! Predetermined ordering parameter templates may be based on the k binary ordering parameters. Preparing ordering parameter templates for the degrees of freedom inherent to the tree structure may enable an improved traversal of the tree structure with a reduced amount of operations.

In various examples, the plurality of k! predetermined ordering parameter templates may be represented by fewer than k! bit vectors based on inversion symmetry between predetermined ordering parameter templates of the plurality of k! predetermined ordering parameter templates. This may reduce an amount of memory required for storing the predetermined ordering parameter templates.

In at least some examples, the desired ordering of the ordered traversal is with respect to a directional query. For example, the direction of a ray in a ray tracing calculation may define the directional query. In various examples, the directions of the directional query may be quantized to a set of m possible directions. Each of the m possible directions may be assigned a predetermined parameter template of the plurality of predetermined parameter templates. For example, if the direction indicated by the directional query is known (e.g. a direction of a ray in raytracing), the appropriate ordering parameter template can be chosen. In at least some examples, the plurality of predetermined parameter templates is specific for the subset of nodes.

In various examples, each of the m possible directions has a query order index. The predetermined parameter template assigned to a direction of the m possible directions may be retrieved using the query order index of said direction. For example, the query order index may be used to determine a section of the memory the corresponding predetermined parameter template is stored at, e.g. by calculating a memory offset or by deducing a register number.

In at least some examples, the directional query may be related to a ray of a raytracing calculation. The m possible directions may correspond to a set of $2^n$ quantized directions in n-dimensional space (e.g. $2^3$ possible directions in three-dimensional space). The desired ordering of the ordered traversal may be with respect to a direction of the ray of the raytracing application. Using the method to order the tree structure in a ray-tracing application, e.g. to determine an intersection of a ray with objects within a scene of the raytracing application, may enable an improved speed of the raytracing application.

For example, the desired ordering of the ordered traversal may be with respect to a directional query. A direction of a directional query may be defined by a point on an n-dimensional sphere. The tree structure may be embedded into an n-dimensional space. The desired order of the tree structure may be defined by the direction of the directional query.

In various examples, the tree structure may be characterized by a branching factor f. The subset of nodes may e.g. be nodes that are child node to the same parent node of the tree structure. Additionally or alternatively, the size of the subset of nodes may be at least 2 and at most f. A predetermined ordering parameter template of the plurality of predetermined ordering parameter templates may be a set of f parameters that define a ordering permutation of the subset of nodes.

In various examples, the single processor operation may be a vector permute operation. A vector permute operation may both copy the subset of nodes to the second memory region and change their ordering within the second memory region.

In at least some examples, the subset of nodes may be a subset of the nodes of the tree structure presently traversed by the method. For example, when traversing the tree structure, the subset of nodes may change according to which part of the tree structure is currently being processed.

In various examples, the method further comprises choosing one or more nodes of the subset of nodes based on a selection criterion using a vector comparison operation. The method may further comprise determining a compaction parameter of a further single processor operation of the vector processing processor instruction set based on the chosen one or more nodes. The further single processor operation may be a vector compaction operation. The method may further comprise copying the one or more nodes from the second memory region to a third memory region using the further single processor operation and the compaction parameter such that the one or more nodes are stored adjacently within the third memory region. This may enable choosing some of the nodes of the subset of nodes, for which a condition applies, e.g. which may be intersected by a ray in a raytracing calculation. For example, the one or more nodes may be chosen based on an intersection of a ray of a raytracing calculation with a node of the subset of nodes. In some cases, zero nodes of the subset of nodes may be chosen, if none of the nodes of the subset of nodes matches the selection criterion. For example, the method may comprise choosing the one or more nodes if at least one of the nodes of the subset of nodes matches the selection criterion. In at least some examples, the tree structure comprises a plurality of nodes. The plurality of nodes may represent a plurality of objects of a scene of a raytracing calculation.

In at least some examples, the method further comprises selecting one or more subsets of nodes to be processed from the tree structure based on the one or more chosen nodes and repeating the method by successively using the one or more subsets of nodes to be processed as the subset of nodes. This may enable a recursive processing of the tree structure using the method, e.g. separated into chunks that conform to width vector operations can be calculated at within the architecture of a system executing the method. For example, using a processor capable of vector operations of 512 bits width, the subset of nodes may comprise 8 nodes at 64 bit per node.

In various examples, the tree structure may be based on a bounding volume hierarchy. The nodes of the tree structure may represent bounding boxes of objects within a scene of a raytracing calculation. Using the method for the raytracing calculation may decrease a time required for the calculation.

Examples further provide a method for determining an occlusion of a point along a ray in a raytracing scene. The raytracing scene comprises a plurality of objects. The plurality of objects are represented by a plurality of nodes of a tree structure. The method comprises determining a direction of the ray. The method further comprises traversing the tree structure using the method for the ordered traversal of the subset of nodes according to one of the above examples. The desired ordering of the ordered traversal is with respect to a direction of the ray. A first subset of nodes of the tree structure to be processed as the subset of nodes is chosen from a root of the tree structure. Subsequent subsets of nodes to be processed as the subset of nodes are chosen based on the one or more chosen nodes. The selection criterion to be used is, whether the ray intersects a bounding box associated with a node of the subset of nodes. Leaf nodes among the chosen one or more nodes are added to a plurality of intersecting leaf nodes. The method further comprises determining the occlusion of the point along the ray based on the plurality of intersecting leaf nodes. Determining the (possibly) intersecting leaf nodes using the above method may reduce a time required for the raytracing calculation on architectures with wide vector instructions.

In various examples, the tree structure may be traversed using a depth-first manner. Alternatively (or alternately or additionally), the tree structure may be traversed using a breadth-first manner.

Examples further provide a computer program having a program code for performing at least one of the methods according to one of the previous examples, when the computer program is executed on a computer, a processor, or a programmable hardware component.

Examples further provide an apparatus comprising an interface, a control module and a processor. The interface is configured to obtain information related to a tree structure and ordering information for the tree structure. The control module is configured to control the interface and the processor. The processor is configured to execute commands according to a vector processing processor instruction set. The control module is configured to execute at least one of the methods according to one of previous examples using the processor.

BRIEF DESCRIPTION OF THE FIGURES

Some examples of apparatuses and/or methods will be described in the following by way of example only, and with reference to the accompanying figures, in which

FIGS. 5a-5c show exemplary data layouts; and

FIGS. 6a-6e show tables comprising performance evaluations of examples.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
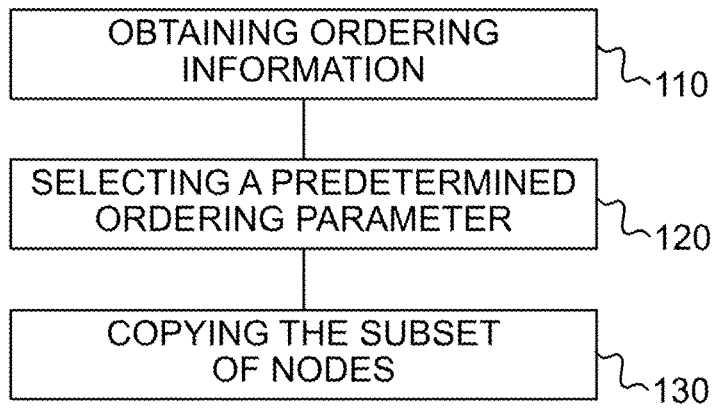
FIG. 1a shows a flow chart of an example of a method for an ordered traversal of a subset of nodes of a tree structure.
Figure 1B:
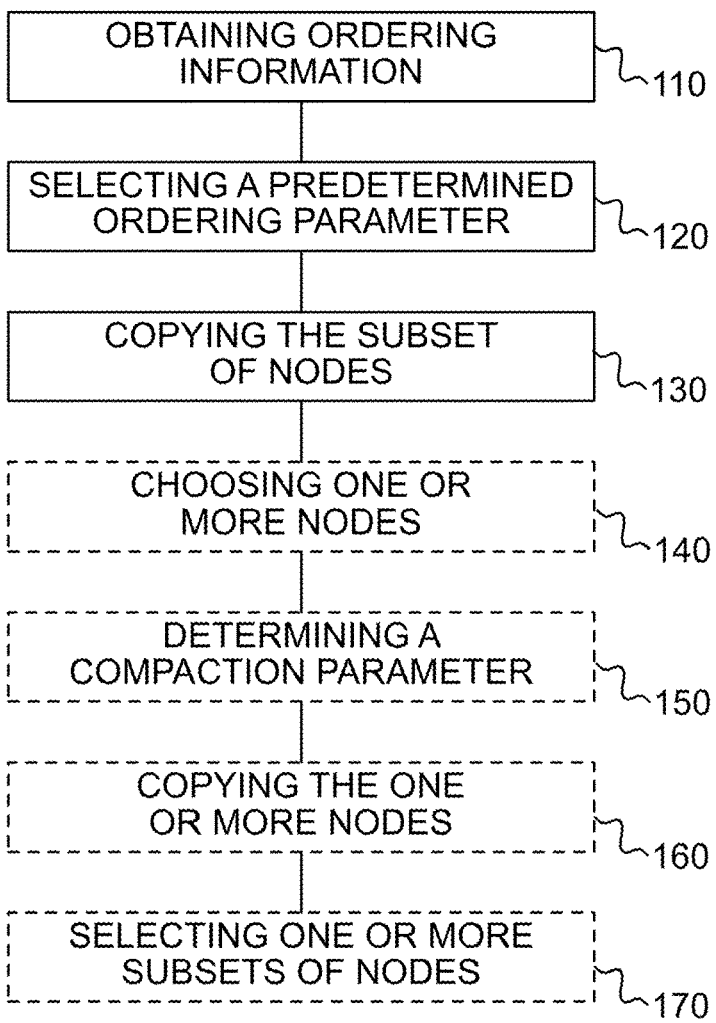
FIG. 1b shows a flow chart of another example of a method for an ordered traversal of a subset of nodes of a tree structure.
Figure 1C:
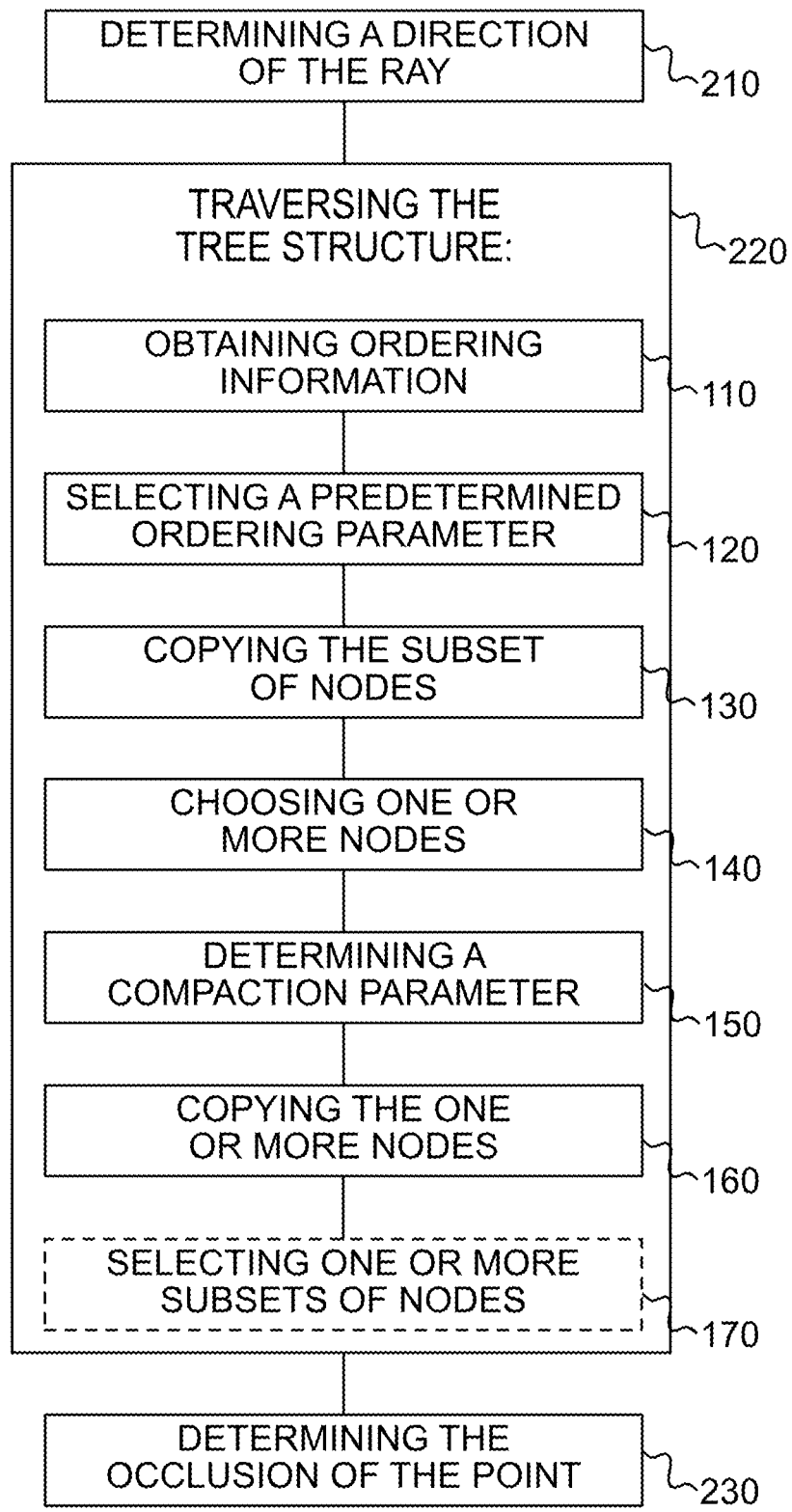
FIG. 1c shows a flow chart of an example of a method for determining an occlusion of a point along a ray in a raytracing scene.
Figure 2:
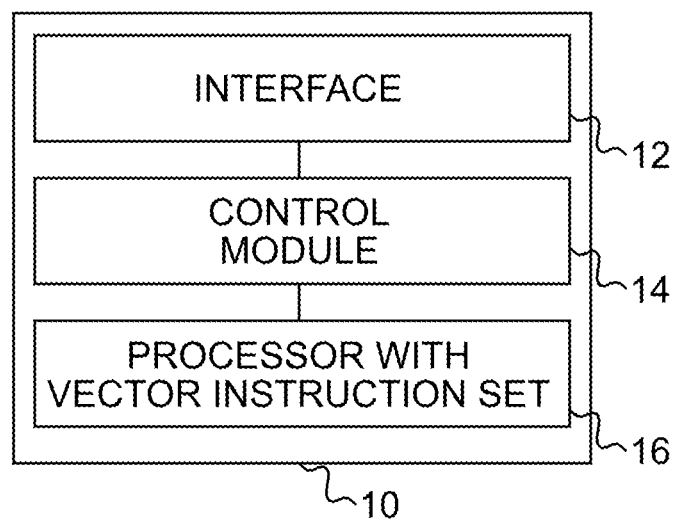
FIG. 2 shows a block diagram of an example of an apparatus configured for an ordered traversal of a subset of nodes of a tree structure.

FIG. 1a shows a flow chart of an example of a method for an ordered traversal of a subset of nodes of a tree structure (e.g. a method for traversing the subset of nodes of the tree structure based on a desired order for the traversal of the subset of nodes), FIG. 1b shows a flow chart of an extended example of the method and FIG. 2 shows a block diagram of a corresponding apparatus 10, configured to execute at least one of the methods introduced in connection with FIGS. 1a and/or 1b. The apparatus 10 may be further configured to execute the method introduced in connection with FIG. 1c.

The method shown in FIGS. 1a and 1b comprises obtaining 110 ordering information indicating a desired order of/for the ordered traversal of the tree structure. The method further comprises selecting 120 a predetermined ordering parameter template from a plurality of predetermined ordering parameter templates based on the ordering information. The method further comprises copying 130 the subset of nodes of the tree structure from a first memory region to a second memory region using a single processor operation of a vector processing processor instruction set such that the subset of nodes of the tree structure is stored within the second memory region in the desired order. The selected predetermined ordering parameter template is used as a parameter for the single processor operation.

In various examples, the ordered traversal of the subset of nodes of the tree structure comprises traversing the subset of nodes of the tree structure in the order indicated by the ordering information. For example, the ordered traversal may be performed recursively over the entire tree structure, wherein the order of a first subset of nodes indicates an order, according to which further subsets of nodes linked with the nodes of the first subset of nodes are to be processed.

In at least some examples, the subset of nodes are nodes that are child node to the same parent node of the tree structure. In some examples, the subset of nodes may comprise the entire tree structure. The subset of nodes may be a treelet of the tree structure, e.g. the subset of nodes may comprise nodes linked by a common parent node. For example, the tree structure may comprise a plurality of nodes, and the subset of nodes may be a part of the tree structure (e. the treelet) presently traversed by the method. The subset of nodes presently traversed by the method may be altered recursively or iteratively, e.g. based on the order of the subset of nodes within the second memory region. For example, the tree structure may be traversed using a depth-first manner. Alternatively, the tree structure may be traversed using a breadth-first manner. The subset of nodes may be a subset of the nodes of the tree structure presently traversed by the method. For example, the number of nodes comprised in the subset of nodes may be based on the single processor instruction, e.g. based on the number of vector elements that can be processed by the single processor instruction at the same time. For example, when traversing the tree structure, a maximal number of nodes within the subset of nodes may be defined by the (width of the) single processor instruction.

In various examples, the tree structure may comprise a plurality of nodes, with the subset of nodes being comprised by the plurality of nodes. Except for a root node of the tree structure, (all) nodes of the tree structure may comprise a parent node and zero or more child nodes. For example, the tree structure may be characterized by a branching factor f. In this case, each node may have up to f (direct) child nodes. The maximum number of children of a node of the tree structure may determine the branching factor of the hierarchy (the tree structure). In at least some examples, the branching factor may be larger than 4 (e.g. 8). In at least some examples, the size of the subset of nodes may be at least 2 and at most f. In various examples, e.g. when the method is used in a raytracing calculation, the tree structure may be based on a bounding volume hierarchy (BVH), e.g. of a multi-branch BVH (MBVH). The nodes of the tree structure may represent bounding boxes of objects within a scene of a raytracing calculation. For example, if a parent node is parent to a child node within the tree structure, the bounding box of the node may comprise the bounding box of the child node.

In at least some examples, the ordering information indicates the order, in which the subset of nodes and/or the tree structure is to be traversed. In other words, the ordering information may indicate or specify in which order the subset of nodes are to be saved within the second memory region. For example, the desired order of the ordered traversal may indicate, in which order the nodes of the tree structure and/or of the subset of nodes are to be processed in a subsequent processing step, e.g. in which order the next subset of nodes to be processed by the method is to be selected. For example, in a raytracing calculation, the desired order of the tree structure may be according to a direction of a ray within the raytracing calculation.

In various examples, a predetermined ordering parameter template is a parameter template to be used as a parameter for a copying operation, e.g. specifying a resulting order of copied data within the second memory region. A predetermined ordering parameter template may e.g. indicate a permutation within the order of nodes when copying the subset of nodes from the first memory region to the second memory region. A predetermined ordering parameter template may comprise set of ordering parameters, corresponding to a subset of nodes, where for each node exists (exactly) one ordering parameter indicating the position of the node within the ordered list of nodes. For example, for a tree structure of branching factor f, a predetermined ordering parameter template of the plurality of predetermined ordering parameter templates may be a set of f parameters that define an ordering permutation of the subset of nodes. The predetermined ordering parameter template may be calculated before the method is applied to the subset of nodes. For example, the plurality of predetermined ordering parameter templates might not be determined after receiving the ordering information. In some examples, the plurality of predetermined ordering parameter templates may be static over two or more subsets of nodes to be processed by the methods, e.g. for subsets having the same tree sub-structure within the subset. For example, for each feasible tree sub-structure within the subset, a plurality of predetermined ordering parameters may be defined.

In at least some examples, the ordering information may indicate a query order index. The query order index may be used to select the appropriate predetermined ordering parameter template within the plurality of predetermined ordering parameter templates. The predetermined parameter template assigned to the desired order of the ordered traversal of the tree structure may be retrieved using the query order index of said desired order. For example, the appropriate plurality of predetermined ordering parameter templates may be chosen based on the tree sub-structure (e.g. the treelet) of the subset of nodes, and the predetermined ordering parameter template within the plurality of predetermined ordering parameter templates may be chosen based on the query order index. For example, the query order index may be used to determine an offset within a memory region comprising the plurality of predetermined ordering parameter templates, e.g. to retrieve or point to the appropriate predetermined ordering parameter template. Each query (e.g. the ordering information) may have a query order index that selects the corresponding predetermined ordering parameter template from the plurality (e.g. set) of predetermined ordering parameter templates corresponding to the current subset of nodes.

In some examples, the ordering information indicates k binary ordering parameters related to k degrees of freedom for the order of the tree structure. The selecting 120 may select the corresponding predetermined ordering parameter template from a plurality of k! (i.e. one for every permutation of the k nodes in the subset) predetermined ordering parameter templates (wherein the k! predetermined ordering parameter templates are based on the k binary ordering parameters).

In some examples, the plurality of k! predetermined ordering parameter templates are represented by (e.g. stored within) k! bit vectors. In some other examples, the plurality of k! predetermined ordering parameter templates are represented by (and/or stored within) fewer than k! bit vectors based on a symmetry (e.g. an inversion symmetry or other symmetries) between predetermined ordering parameter templates of the plurality of k! predetermined ordering parameter templates. In some examples, the symmetry may depend on the structure of the query order index. In other words, the plurality of k! predetermined ordering parameter templates may be represented by (e.g. stored within) at most or fewer than k! bit vectors. Fewer than k! bit vectors may be possible if symmetries between the k ordering parameters exist with respect to the query order index. While for small numbers of k the entire plurality of ordering parameter templates may be stored, for large k (only) a small subset of all ordering parameter templates might be stored locally per subset of nodes. These local subsets might not be disjoint in general, so some ordering parameter templates might be stored multiple times or not at all.

In various examples, the single processor operation may copy the subset of nodes from the first memory region to the second memory region using the second memory region as target parameter, the first memory region as source parameter and the predetermined ordering parameter template as permutation parameter (e.g. as parameter specifying, in which order the data stored in the first memory region is to be stored within the second memory region). For example, the single processor operation may copy the subset of nodes to the second memory region within a single processor instruction. In at least some examples, the single processor operation copies (all of) the nodes of the subset of nodes in parallel (as a vector operation). The desired order of the ordered traversal may be reflected in the order of the subset of nodes within the second memory region. For example, the subset of nodes may be stored within the second memory region according to the desired order.

In various examples, the single processor operation is a vector permute operation. For example, the single processor operation may be a vpermq processor operation of the Advanced Vector eXtensions (AVX) AVX2 or AVX-512 vector processing processor instruction set. In some examples, the AVX2 or the AVX-512 are the vector processing processor instruction set. Alternatively, other vector processing processor instruction sets may be used, e.g. a vector processing processor instruction set of a Central Processing Unit, of a graphics card suitable for executing general-purpose commands and/or of a processor card/compute card.

In various examples, the desired ordering of the ordered traversal is with respect to a directional query. The directional query may indicate the desired ordering of the ordered traversal. The desired order of the tree structure may be defined by the direction of the directional query. In general, a direction of a directional query may be defined by/as a point on an n-dimensional sphere (wherein the tree structure is embedded into an n-dimensional space), or in the quantized case as the area on an n-dimensional sphere. For examples, the n-dimensional sphere may be covered by areas. Each area may correspond to a value of the query order index. The query order index related to a specific directional query (e.g. related to the directional query) may be the one that contains/comprises the point of the directional query in its area on the n-dimensional sphere. The directional query may be defined as a direction within n-dimensional space. For example, in the case of n=3 (three-dimensional space, e.g. in a raytracing calculation within three-dimensional space), the directional query may be defined as direction within the three-dimensional space.

In at least some examples, the directions of the directional query are quantized to a set of m possible directions. For example, in three-dimensional space, the directions of the directional query may be quantized to a set of 8 ($2^3$) possible directions (made up of three binary directions (on the x, y and z-axis). In some examples, setting m to 1 (e.g. quantizing all directions to a set of 1 possible direction) may result in the same order for all directions. Each of the m possible directions may be assigned/have a query order index per subset of nodes. Thus, each of the m possible directions may be assigned a predetermined parameter template of the plurality of predetermined parameter templates. The predetermined parameter template assigned to a direction of the m possible directions may be retrieved using the query order index of said direction. In at least some examples, the plurality of predetermined parameter templates is specific for the subset of nodes. In other words, the plurality of predetermined parameter templates may be specific for each subset of nodes. In at least some examples, subsets of nodes of the tree structure having the same sub-tree structure (e.g. the same structure within the treelet comprising the subset of nodes) may have the same plurality of predetermined parameter templates. For example, for each subset of nodes, a specific plurality of predetermined parameter templates may be generated or obtained. The method may further comprise obtaining and/or generating a specific plurality of predetermined parameter templates for the subset of nodes. For every subset of nodes a desired traversal order may be determined for every possible value of the query order index (i.e. for every quantized direction). This means that the same query order index can reference different parameter templates for different subset of nodes. In some examples, a global set of parameter templates may be defined for every query order index, and the query order index may be a function of, i.e. depend on, the (specific) subset of nodes.

In at least some examples, the directional query may be related to a (single) ray of a raytracing calculation. The m possible directions may be a set of $2^n$ quantized directions in n-dimensional space (e.g. the $2^n$ possible directions in n-dimensional space (e.g. $2^3$ possible directions in three-dimensional space) if each direction is regarded in a binary fashion. In general, the possible directions are infinite for n>1. However, in the special case of quantization of the directions to quadrants (n=2), octants (n=3), etc. there are $2^n$ query order indexes.). The desired ordering of the ordered traversal may be with respect to a direction of the ray of the raytracing application. For example, each of the 8 possible directions within three-dimensional space may define one of the m possible directions of the directional query.

In various examples, as shown in FIG. 1b, the method further comprises choosing 140 one or more nodes of the subset of nodes based on a selection criterion, e.g. using a vector comparison operation. The method may further comprise determining 150 a compaction parameter of a further single processor operation of the vector processing processor instruction set based on the chosen one or more nodes. The further single processor operation may be a vector compaction operation. The method may further comprise copying 160 the one or more nodes from the second memory region to a third memory region using the further single processor operation and the compaction parameter such that the one or more nodes are stored adjacently (e.g. directly adjacent, directly mutually adjacent) within the third memory region.

In various examples, the choosing 140 may choose nodes of the subset of nodes that (positively) fit the selection criterion. Alternatively, the choosing 140 may choose nodes of the subset of nodes that fail the selection criterion. For example, the choosing 140 may select nodes of interest among the subset of nodes for the one or more nodes. For example, the choosing 140 may output a bit vector corresponding to the compaction parameter. The choosing 140 may comprise the determining 150 of the compaction parameter. In various examples, the determining 150 of the compaction parameter may generate a bit vector indicating whether the nodes of the subset of nodes are chosen (e.g. for processing in subsequent processing steps such as the copying 160). In at least some examples, the chosen one or more nodes are denoted the active subset of nodes.

When using the method in a raytracing calculation, the one or more nodes may be chosen 140 based on an intersection of a ray of a raytracing calculation with a node of the subset of nodes. For example, the tree structure may comprise a plurality of nodes. The plurality of nodes may represent (bounding boxes of) a plurality of objects of a scene of a raytracing calculation. For example, if the ray intersects with a bounding box represented by a node of the subset of nodes, that node may be chosen 140 for the one or more nodes.

In various examples, the vector comparison operation may choose 140 (all of) the one or more nodes within a single processor instruction/operation. Alternatively, the vector comparison operation may choose 140 the one or more nodes using more than a single processor instruction/operation, e.g. by first performing the vector comparison operation on a first subset of nodes of the subset of nodes and by subsequently performing the vector comparison on a second subset (disjoint from the first subset) of nodes of the subset of nodes. In some examples, the vector comparison operation is comprised within the vector processing processor instruction set.

In at least some examples, the determining 150 of the compaction parameter may comprise generating a bit vector based on the selection of the one or more nodes. For example, the compaction parameter may comprise determining a bit vector (e.g. donated "active mask") wherein each node of the subset of nodes is represented by a bit within the bit vector, and wherein a first value (e.g. a 1) set for that bit may indicate that the associated node is chosen, and wherein a second value (e.g. a 0) set for that bit may indicate that the associated node is not chosen. In various examples, the active mask may be the compaction parameter. Alternatively, the determining 150 of the compaction parameter may further comprise determining 150 the compaction parameter based on the active mask. For example, the compaction parameter may comprise information to a location of the one or more nodes within the second memory region. The determining 150 may comprise selecting an appropriate compaction parameter (comprising the information to the location of the one or more nodes within the second memory region) based on the active mask.

In various examples, the further single processor operation may be an operation that copies the content of a plurality of memory (sub-) regions (e.g. memory sub-regions where the one or more nodes are stored within the second memory region) to the third memory region such that the copied content is stored (directly) adjacently within the third memory region. For example, the further single processor operation may be a vector compression operation, e.g. vpcompressq of the AVX-512 vector processing processor instruction set. For example, the third memory region, the active mask and the second memory region may be used as parameters for the further single processor operation (e.g. for the vpcompressq operation). In the AVX-512 vector processing processor instruction set, vpcompressq a{k}, b: selects 64 bit elements in b using mask k and compress the selected elements to form a continuous array aligned to the low element in a. a may be the third memory region, k may be the active mask and b may be the second memory region. In at least some examples, the one or more nodes may be stored within the third memory such, that they form a continuous memory region (e.g. an array) within the third memory region.

In various examples, as further shown in FIG. 1b, the method may further comprise selecting 170 one or more subsets of nodes to be processed from the tree structure based on the one or more chosen nodes and repeating the method by successively using the one or more subsets of nodes to be processed as the subset of nodes. Nodes may be put on the stack based on the desired order of the ordered traversal of the tree structure (e.g. in reverse order when using a stack). When using a stack, this may be performed by choosing predetermined ordering parameters for the successive permute → compress → store operations such, that the nodes are put on the stack in inverse order (e.g. without using additional operations). Subsequently, the element (e.g. node) on top of the stack may be "popped off" the stack and the corresponding subset of nodes may be processed using the method for the ordered traversal of the subset of nodes. When using a different data structure, e.g. a (temporary) First In First Out (FIFO) data structure or buffer, the predetermined ordering parameters may be chosen such that the respective operations put the nodes in the appropriate order in the FIFO data structure. For example, a subset of the one or more subsets may comprise nodes of the plurality of nodes of the tree structure that are child nodes to one of the nodes of the one or more nodes. In various examples, the one or more nodes may be put on a stack, and the subset of nodes may be determined based on the next node that is "popped" off (obtained from) the stack.

FIG. 1c shows a flow chart of an example of a method for determining an occlusion of a point along a (single or a plurality of) ray(s) in a raytracing scene. The raytracing scene comprises a plurality of objects. The plurality of objects are represented by a plurality of nodes of a tree structure. The method comprises determining 210 a direction of the ray. The method further comprises traversing 220 the tree structure using the method for an ordered traversal of a tree structure according to one of the above examples. The desired ordering of the ordered traversal is with respect to a direction of the ray(s). A first subset of nodes of the tree structure to be processed as the subset of nodes is chosen from a root of the tree structure. Subsequent subsets of nodes to be processed as the subset of nodes are chosen based on the one or more chosen nodes. The selection criterion to be used is, whether the ray intersects a bounding box associated with a node of the subset of nodes. The method further comprises adding leaf nodes among the chosen one or more nodes to a plurality of intersecting leaf nodes. The method further comprises determining 230 the occlusion of the point along the ray(s) based on the plurality of intersecting leaf nodes.

In various examples, the occlusion of the point along the ray in the raytracing scene may be caused by at least one of the plurality of objects. The calculation of occlusion of a point along a direction may be an essential operation in many algorithms, e.g. for collision computation or for image synthesis. The result of the determination of occlusion is the answer to the question "is there an occlusion by one or several objects of the plurality of objections, and if so, which of these objects is closest to the point". For example, the determining of the occlusion of the point along the ray may comprise the object of the plurality of object, which is closest to an origin point of the ray.

In at least some examples, the plurality of objects may be represented by a plurality of bounding boxes comprising the outlines of the plurality of objects. For example, each object of the plurality of objects may be defined by an n-dimensional (e.g. three-dimensional) outline, and may be represented by a bounding box. For example, the intersection of the ray with an object of the plurality of objects is determined based on the bounding box of the object.

The plurality of objects are represented by a plurality of nodes of a tree structure. For example, leaf nodes of the tree structure may represent the objects of the plurality of objects. The leaf nodes may be assigned the bounding boxes of the corresponding nodes. Parent nodes of the tree structure may be assigned further bounding boxes, which comprise the bounding boxes of their child nodes. For example, a bounding box assigned to a parent node which is parent to a further node that is parent to a leaf node comprises the bounding boxes assigned to the further node and to the leaf node.

The determining 210 of the direction of the ray may comprise quantizing the direction of the ray to a direction of the m possible directions. For example, for a ray tracing calculation in three-dimensional space, the determining 210 of the direction of the ray may comprise quantizing the direction of the ray to one of the 8 possible directions within three-dimensional space. The determining 210 of the direction of the ray may further comprise determining the query order index for the direction of the ray.

For example, the traversing 220 of the tree structure may use the direction of the ray and/or the corresponding query order index as ordering information. When starting the traversing 220 of the tree structure, the method may comprise constructing the subset of nodes from the root of the tree structure, e.g. based on a width vector operations can be calculated at within the architecture of a system executing the method. In various examples, subsequent subsets of nodes to be processed as the subset of nodes may be selected similar to the selecting 170 of the one or more subsets of nodes to be processed from the tree structure, e.g. in a depth-first or in a breadth-first manner. In various examples, the tree structure may be traversed using a depth-first manner. Alternatively or additionally, the tree structure may be traversed using a breadth-first manner. The traversing 220 of the tree structure may further comprise selecting the plurality of predetermined ordering parameter templates based on the subset of nodes presently being traversed by the method.

In various examples, the plurality of intersecting leaf nodes may comprise the nodes of the plurality of nodes associated with objects of the plurality of objects intersecting with the ray. For example, an intersecting leaf node of the plurality of intersecting leaf nodes may be associated with an object of the plurality of objects, which is represented by a bounding box intersecting the ray. The occlusion of the point along the ray may be determined 230 based on the object associated with an intersecting leaf node of the plurality of intersecting leaf nodes arranged closest to an origin of the ray. In at least some examples, the method may be further applied to ray packets, e.g. by choosing 140 the one or more nodes over a plurality of rays.

In at least some examples, the apparatus 10 of FIG. 2 comprises an interface 12, configured to obtain information related to the tree structure and the ordering information for the tree structure. The apparatus 10 further comprises a control module 14 configured to control the interface and a processor 16. The processor 16 is configured to execute commands according to a vector processing processor instruction set. The control module 14 is configured to execute at least one of the methods introduced in connection with one of the FIGS. 1a to 1c using the processor 16.

The interface 12 may correspond to one or more inputs and/or outputs for receiving and/or transmitting information, which may be in digital (bit) values according to a specified code, within a module, between modules or between modules of different entities. The control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

The processor 16 may be a Central Processing Unit (CPU) of a computer system, or it may be an application-specific computing unit, e.g. a processor card/compute card (such as an Intel Xeon Phi processor card) or a graphics card suitable for executing general purpose commands according to a vector processing processor instruction set. In some examples, the control module 14 may be implemented by the processor 16. Alternatively, the processor may be separate from one or more processing units or devices of the control module 14. The control module 14 is coupled to the interface 12 and to the processor 16.

In various examples, the first memory region, the second memory region and/or the third memory region may be a processor register (e.g. of the processor 16) and/or memory regions within a main memory of a computer system executing the method. In some examples, the third memory region may be (part of) a stack.

More details and aspects of the methods and the apparatus are mentioned in connection with the proposed concept or one or more examples described above (e.g. FIG. 1*a* to 1*c*). The methods and apparatus may comprise one or more additional optional features corresponding to one or more aspects of the proposed concept or one or more examples described above or below.

In an example of a method for calculating an occlusion of a given point along a given line, the calculation may start at the root node. The following operations may be performed:
(1) (All) children (e.g. nodes of the subset of nodes) for which at least one intersection point with the line segment exists (e.g. the one or more nodes) may be marked as active.
(2) Different priorities may be associated with the active children to then put the same onto a stack, sorted according to their priority, together with their distance to the respective intersection point.
(3) The topmost node may be taken off the stack. If there is no more node present, the calculation of occlusion may be completed. If the node is a branch, the procedure may be repeated starting from (1), if it is a leaf, the method may continue with (4).
(4) The objects of the leaf may be intersected by the line segment, and if an intersection point exists, the line segment may be limited to the distance to the entry point and those nodes may be removed from the stack whose entry distance is now outside the shortened line segment. Subsequently, the method may continue with (3).

For reducing calculation steps, (2) may be decisive. An advantageous arrangement of the active children in each iteration may make it possible to benefit from the occlusion of the objects with respect to each other. By limiting the line segment in (4), nodes and objects which are further away may be skipped. In case of an unfavorable selection of the arrangement in (2), nodes and objects which are further away may be visited first and might consequently not be skipped. Modern computers offer vector commands for data-parallel program sequences. In at least some embodiments, these vector commands may then be utilized efficiently when the branching factor exactly corresponds to the number of vector elements. The complexity of the arrangement (2) may increase with the branching factor, however.

In other systems, for the arrangement in (2), two different heuristic approaches may be used:
(5) an arrangement of the nodes according to the distances to the respectively considered points.
(6) A predefined arrangement depending on the sign of the directional components, individually stored for each node.

The procedure (2) may be divided into two operations:
(7) Permutating the active nodes into the order determined by heuristics.
(8) Concentration of the active nodes by removing the inactive nodes and continuously placing the active nodes onto the stack.

For both heuristics (5) and (6) there may be different implementations which basically differ due to the number and type of required machine commands. The evaluation effort of (5) may strongly increase with the branching factor, as the horizontal dependency between the node distances may only inefficiently be mapped to vector commands. For (6), up to today, efficient solutions may have only been provided up to a branching factor of four in literature.

In at least some embodiments, the approach for an efficient implementation of heuristics (6) for branching factors greater than four may directly map the operations (7) and (8) for heuristics (6) onto two classes of vector commands available in modern vector command sets:
(9) a permutation command (e.g. the single processor operation) which enables to rear-range the order of values in a vector according to an index vector.
(10) A concentration command (e.g. the further single processor operation) which enables to concentrate individual active values of a vector, defined by a mask, into a continuous unit and align and/or orient the same with respect to the first element of the vector.

(9) may be used to adapt the order of the nodes according to the 8 possible directional signs (in three dimensions). Subsequently, the mask of the active nodes may be calculated and the results (e.g. the one or more nodes) may be concentrated/compacted into a continuous list of active nodes using (10). Sequentially processing the node list may then correspond to the arrangement according to heuristics (6). By a corresponding design of the memory layout of the nodes, the values of the 8 required index vectors may be encoded with an improved or optimum alignment for a vector load command. The method may be realized in two variants, for one branching factor either corresponding to half the vector width (F1 302) or to the whole vector width (F2 304).

Figure 3:
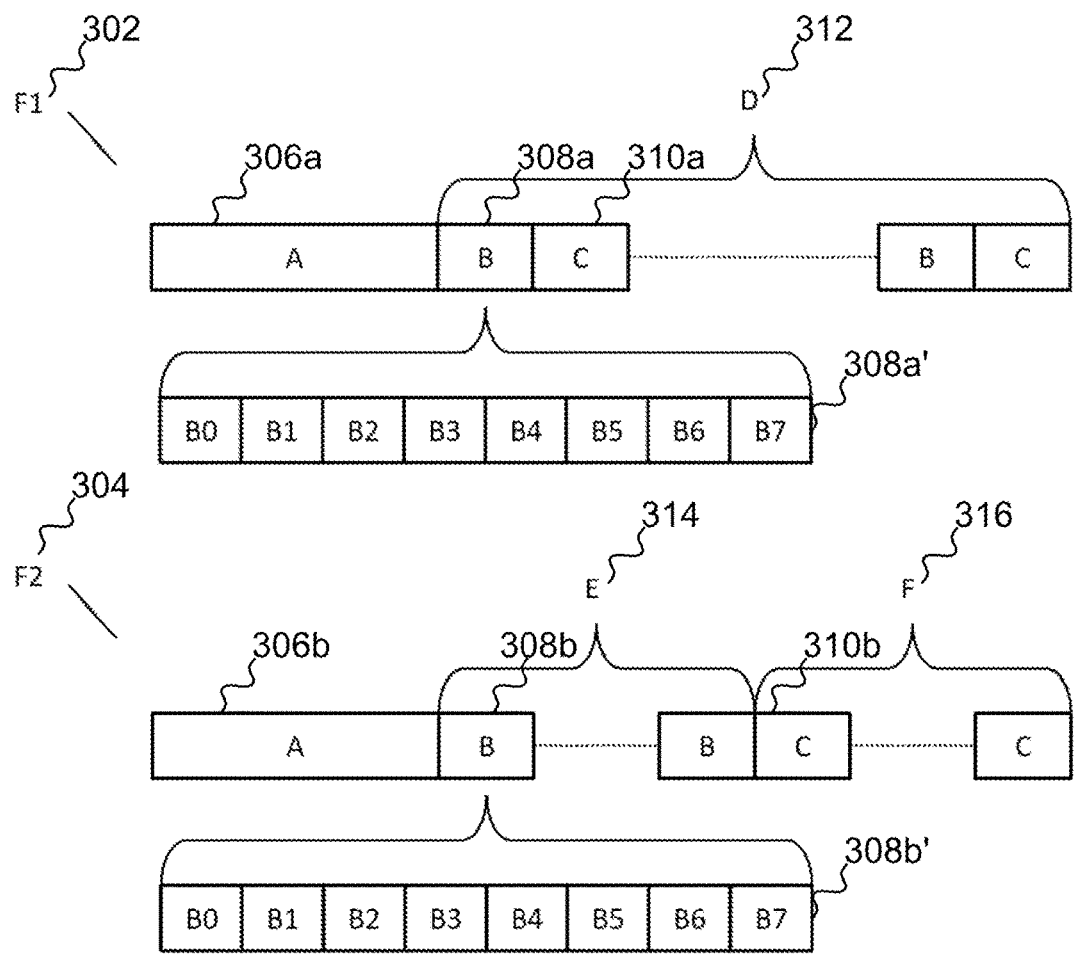
FIG. 3 shows a schematic drawing of a memory layout for a subset of nodes.

FIG. 3 shows a schematic drawing of a corresponding memory layout for node groups. Nodes may be combined into groups of the size N, wherein N designates the branching factor. (A 306*a/b*) may comprise the parameters of the bounding volumes for N nodes, (B 308*a/b*) may contain one value for each of the 8 index vectors, broken down into (B0) to (B7) (308*a/b'*), (C 310*a/b*) may contain the pointer to the group of children. One pair (B 308*a/b*) and (C 310*a/b*) may each define one node, together with the corresponding parameters from (A 306*a/b*). (F1 302) may show (306*a*-310*a*) the variant for N equal to half the vector width. In this case, (B 308*a*) and (C 310*a*) of one node may be directly adjacent to each other, and N node pairs may be joined (D 312). (D 312) may be completely loaded into a vector register and by adjusting and/or orienting the values (B0) to (B7) (318a') with respect to the lowest bit of (B 306a) considering the directional signs, the suitable index vector may result which is again applied to (D 312) corresponding to (9) to order the nodes (C 310a). (F2 304) shows the variant for N equal to the vector width. In this case, (B 308b) and (C 310b) of one node may be located in separate vectors of the length N. In vector (E 314) N nodes (B 308b) are joined and in the same sequence, the associated N nodes (C 310b) may be joined in vector (F 316). (E 314) may be loaded into a vector register and by an orientation of the values (B0) to (B7) (308b') to the lowest bit of (B 308b) considering the directional signs the suitable index vector results which may be applied to (F 316) equal (9) to order the nodes (C 310b).

At least some embodiments of the arrangement method may be based on the strongly reduced computational effort as compared to prior implementations due to the completed vectorization of the calculation of occlusion. This way, both software implementations and also specialized hardware may be realized with a clear advantage regarding the number of machine commands and the capacity of the computing resources.

In Test scenes rendered with a novel single ray traversal algorithm for wide vector units (WiVe) (e.g. the method according to one of the FIGS. 1a to 1c) using diffuse path tracing according to an embodiment, a test implementation of WiVe supports the AVX-512 instruction set and delivers 11%-38% increased single ray tracing performance over Intel Embree, shading included.

Utilizing the vector units of current processors for ray tracing single rays through Bounding Volume Hierarchies may be accomplished by increasing the branching factor of the acceleration structure to match the vector width. A high branching factor may allow vectorized bounding box tests but may complicate the calculation of a front-to-back traversal order which may be crucial for efficiency. Examples provide a novel algorithm for single rays, which may be (entirely) based on vector operations that perform a complete traversal iteration in constant time, which may be ideally suited for current and future micro architectures featuring wide vector units. In addition, the single ray technique may be used as a building block to construct a fast packet traversal for coherent rays. In tests, implementations of the method utilize the AVX-512 instruction set and may demonstrate significant performance gains over state-of-the-art solutions. At least some embodiments may be based on a spatial data structure, a bounding volume hierarchy, parallel ray tracing and/or vectorized data processing.

A bounding volume hierarchy (BVH) is a structure that may be used for efficient ray tracing when considering global illumination effects. Efficiency may be especially important in the Film and games industry. Basic traversal of a single ray through a binary BVH may offer very little data parallelism. Two fundamental approaches may emerge from the efforts to remedy the situation, tracing multiple rays simultaneously, and increasing the branching factor of the BVH. Both approach might be efficient (only) if certain constrains apply. Tracing multiple rays may require the availability of multiple rays in the first place, which might often not be convenient for applications to provide. Ideally, rays that are traced together may be coherent with respect to the traversal path through the BVH. Increasing the branching factor of a BVH may provide data parallel calculations for single rays, but may reduce culling opportunities and may complicate the computation of a front-to-back traversal order. In at least some embodiments, the sweet spot for the branching factor appears to be between 2 and 8, depending on the hardware architecture and the implementation used.

The two approaches may be combined for hybrid traversal methods. For real world applications, the most relevant approach by far may be single ray traversal of multi-branching BVHs (MBVHs) due to its straightforward integration into complex shading pipelines. Industry-driven development of ray tracing libraries for both CPUs and GPUs may lead to highly improved traversal implementations for current micro architectures which may be challenging to compete with. However, the introduction of new hardware features such as AVX-512 may make the efficient implementation of novel algorithmic ideas feasible.

At least some examples may provide a novel single ray traversal algorithm which may map (all) relevant traversal operations to vector instructions, including front-to-back ordering for multi-branching BVHs with branching factors of 8 (BVH8) or higher. The benefit may be a significantly reduced algorithm complexity and constant-time execution, which may be ideal for current and future wide vector micro architectures. In addition, the single ray algorithm as a building block to construct a fast packet traversal for coherent rays. Implementations utilizing the AVX-512 instruction set may demonstrate significant performance gains over other systems.

In some systems, a multi-branch BVH may reduce the depth of a binary hierarchy by removing intermediate nodes to make it possible in a single traversal step to test multiple children. In addition to increased memory access, coherence and fewer traversal steps this approach may enable data-parallel bounding box intersection tests using vector instructions. Computation time spent during a traversal step may be shifted from intersection tests to child ordering and stack operations. On GPUs, multiple single rays may be processed efficiently, independently within vector registers and traced via a binary BVH.

Ray packets may offer another possibility to map ray tracing to vector instructions by processing a different ray in each vector element simultaneously. Bounding volumes for ray packets such as frustums, intervals and corner rays may be used to cull nodes conservatively to reduce the number of ray-bounding box intersections. Rays within a packet may be coherent, i.e. follow the same traversal path in order to be active at the same time. Such behavior may be frequent for camera rays or shadow rays towards small light sources, but not necessarily for higher order effects.

Ray streams is a technique focused on incoherent rays, where for every traversal step a stream of single rays is intersected with the same node and partitioned into hit and miss groups. In order to utilize vector registers, rays may be gathered from the stream (which may be an expensive operation on many architectures with wide vector units). Combining ray streams with a multi-branch BVH may reduce or remove gather operations. For front-to-back traversal, a method may allow each ray to follow its preferred order through the BVH, which may be important for culling.

Accessing a node's children in a front-to-back order for a given ray may be facilitated by either the distance heuristic or the sign heuristic, which may be accurate (only) in the case of non-overlapping children's bounding boxes. In case of the distance heuristic, children may be ordered by the ray's entry point, whereas for the sign heuristic only the ray direction's signs may be considered to choose among pre-computed traversal orders. The sign heuristic may be applied to the BVH4 by storing the intermediate binary BVH, by a local look-up table stored within the nodes, or by a global look-up table returning a compact list of active nodes.

In the following, an exemplary embodiment "WiVe Single Ray Traversal" of at least one of the methods introduced in connection with FIGS. 1a to 1c is shown.

Single ray traversal algorithms may generally be divided into separate phases, which may comprise:

Ray setup (e.g. comprising determining 210 the direction of the ray)

Inner node traversal (e.g. using the method for the ordered traversal of the subset of nodes)

Leaf intersection (e.g. choosing 140 the one or more nodes)

Stack pop (e.g. to select 170 the next subset of nodes to be processed)

Ray setup (e.g. determining the direction of the ray) may perform pre-computation and register alignment with the ray data to facilitate efficient execution of the remaining phases. During inner node traversal, the ray may descent (e.g. using the method for the ordered traversal of FIGS. 1a and/or 1b) down the BVH (e.g. the tree structure) until it misses all children of an inner node or encounters a leaf. In the first case, traversal may directly proceed to the stack pop; in the second case, intersection with the leaf may be performed first, which may reduce the maximum ray distance $t_{far}$ to the closest primitive intersection (if any). The stack pop may take the top node from the stack (if a node exists) and may determine, whether the corresponding ray entry distance is still within $t_{far}$. If this is not the case, the next node may be taken from the stack. After the stack pop, ray traversal may continue with inner node traversal.

Inner node traversal is usually (most) time-consuming; it may be divided into bounding box intersection (slab test), child ordering, and stack push. A key idea of the method according to embodiments may be to map child ordering and stack push operations to permute and compress vector operations (e.g. the single processor operation and the further single processor operation), respectively, which may yield a traversal algorithm (e.t. the method for the ordered traversal of FIGS. 1a and/or 1b) with reduced complexity and increased performance compared other approaches. Instead of ordering children by ray distance, at least some examples may use precomputed front-to-back traversal orders based on the split axes of the BVH construction and ray signs. In other systems, this technique might be employed only for BVHs with branching factors less than or equal to four.

A multi-branching BVH may be constructed either natively or by collapsing an existing binary BVH. Native construction may be faster, while collapsing may be easier to implement on top of a pre-existing framework. In at least some examples, binary BVHs may be constructed by using SAH (Surface Area Heuristics)-based centroid binning without spatial splits to enable better comparability of our results with results obtained with other methods. The primitives at the leaves may be packed into clusters to facilitate vectorized intersection tests. Collapsing may be illustrated in FIG. 4a. The binary BVH may be divided into treelets (e.g. the subset of nodes) starting at the root node and following branches with largest surface area first. The treelet's intermediate leaves may form a node cluster, whereas the treelet's inner nodes may be removed after establishment of the front-to-back traversal order. The index vector for a particular ray direction's sign combination may be derived from the original split axes of the inner nodes. If the split axis of an inner node corresponds to a positive sign, the left branch may be traversed before the right branch; if the sign is negative, the order may be reversed. The example shown in FIG. 4 may show a treelet (e.g. the subset of nodes) with inner nodes 402 labeled by split axis and intermediate leaves labeled by memory order (a), and the corresponding node cluster 404 together with a ray in positive x- and negative y-direction (b 410). The ordering step (c,A) might be performed manually by swapping the branches in (a 400) with a y-direction split axis.

Figure 4A:
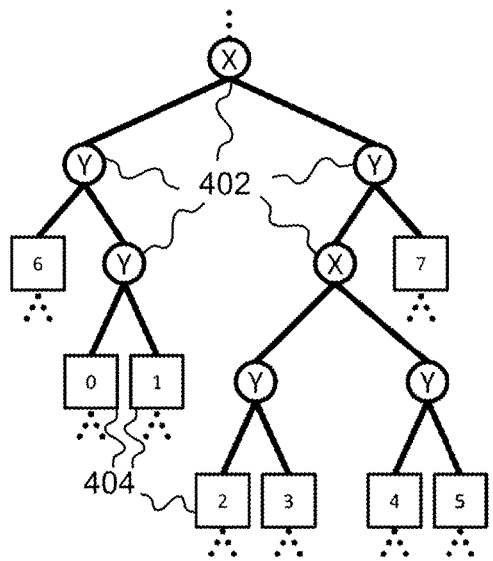
FIGS. 4a-4c illustrates an example of a WiVe single ray algorithm for wide vector units.
Figure 4B:
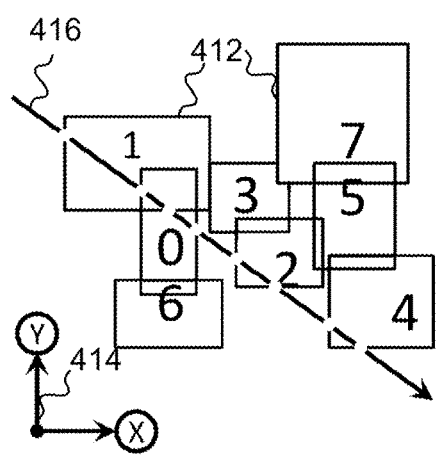
Figure 4C:
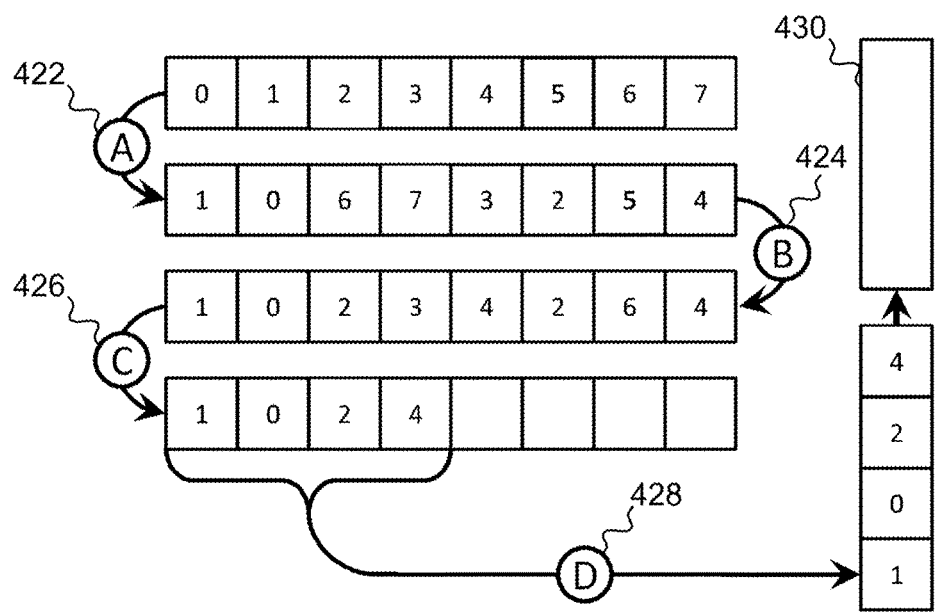

FIG. 4a-c illustrates an example of a WiVe single ray algorithm for wide vector units. (a 400) shows a treelet embedded in a larger binary BVH. Collapsing the treelet may yield a BVH8 node cluster. The inner nodes 402 of the treelet (disks) is labeled according to the split axis used during binary BVH construction. (b 410) shows bounding boxes 412 of the BVH8 node cluster from (a) in a 2D, xy-coordinate system 414. A ray 416 with positive x and negative y sign are shown, with marked entry and exit points on the edges of bounding boxes. c) shows an ordered traversal for the ray in b). The initial order of the nodes may be based on the order in memory, which may be chosen to conform with positive ray signs. Step A 422 may perform the node permutation for the ray, which may be deduced from a) by flipping the children of the Y nodes due to the negative y sign. Step B 424 may perform the intersection test resulting in a mask that may be applied in step C 426 for compressing the valid nodes into a continuous array (e.g. within the third memory region). This array may be stored on the stack 430 in step D 428 with the next node to be traversed on top. In some examples, the third memory region may be the stack. An exemplary algorithm comprising an implementation of the method is illustrated for a BVH8 in FIG. 4c, referring to the node cluster and the ray shown in FIG. 4b, and the hierarchical representation of the node cluster together with the original split axes as represented in FIG. 4a.

A pseudo code version of an example of the method is shown below.

```
1  def traverseRay(node, ray)
2      stack = { }
3      while (true)
4          if (node.isInner ( ))
5              (elems, num) = traverseCluster (node.cluster, ray)
6              stack.push(elems, num)
7          else if(intersectLeaf(node, ray))
8              stack.compress(ray.tfar)
9          if (stack.isEmpty( )) return
10         node = stack.pop(1)
```

The traversal begins with the initial node and tests if it is an inner node or a leaf, i.e. references a node cluster or a primitive cluster, respectively (line 4). In the first case, the traverseCluster function returns a sorted list of elements referencing intersected children and the corresponding entry distances (line 5). This list is pushed to the stack (line 6). In the second case the ray is intersected with the primitives (line 7), and if a valid intersection exists the stack is compressed (line 8) by keeping (only) elements with a node entry distance closer compared to the primitive distance. The algorithm continues by checking the stack (line 9) and terminates if the stack is empty. Otherwise, the stack is popped and the top element becomes the next node (10). The traverseCluster function and the stack push may be the key components of the method.

Child ordering during traversal may rely on pre-computed traversal orders (e.g. the plurality of predetermined ordering parameter templates) for the nodes in every node cluster (e.g. the subset of nodes), where the appropriate order (e.g. the ordering information and/or the query order index) for a specific ray may be selected based on the signs of the ray's directional components. Since there are the x-, y- and z-components, which can either be negative or positive, $2^3=8$ predetermined orders (for the plurality of predetermined ordering parameter templates) may be required per node cluster. A traversal order (e.g. a predetermined ordering parameter template) may be represented by an index vector that specifies how to re-arrange the nodes with respect to the base order, i.e., the order in which the nodes are laid out in memory.

Thus, eight index vectors may be pre-computed and stored with every node cluster. With the index vectors in place, the node elements in FIG. 4c may be permuted (A) (e.g. by copying 120 the subset of nodes using the single processor operation), which may be followed by the slab test producing an active mask (B) (e.g. choosing 140 the one or more nodes and determining 150 the compaction parameter). The mask may be used to compress (e.g. by copying 160 the one or more nodes) the active elements into a continuous array (C) which may be stored directly on top of the stack (D). The following high-level description may describe an exemplary algorithm implementing the method, referencing FIG. 4c):

1. Set up the ray for traversal and define the MBVH root node as current node.
2. If the current node is a leaf, go to step 9.
3. Load the bounding boxes from the current node's child cluster and compute the $t_{min}$ and $t_{max}$ distances for the slab test.
4. Load the index vector corresponding to the ray direction and permute the $t_{min}$ and $t_{max}$ distances accordingly (A).
5. Perform the slab test (e.g. choose 140 the one or more nodes) to produce the active mask (B).
6. Load the child node data (offset to child cluster or primitive cluster and -flags), perform permutation with the index vector and interleave with $t_{min}$ values.
7. Compress the active child node data/$t_{min}$ pairs into a continuous array (e.g. copy 160 the one or more nodes to the third memory region) using the active mask (C) and push the array to the stack (D).
8. Apply a pop operation to the stack to retrieve the new current node; go to step 2.
9. Intersect the ray with the leaf primitives (e.g. the one or more nodes that are leaf nodes within the tree structure). In case a valid intersection exists, reduce the maximum distance of the ray $t_{far}$ to the actual intersection distance and prune the stack, i.e., remove all nodes from the stack for which $t_{far} < t_{min}$; go to step 8.

In the case of single-instruction support for the permutation and compression operations, this algorithm may have a time complexity of O(1) for both the child ordering and stack push operations compared to the typical O(n log n) complexity for sorting n active nodes and O(n) complexity for pushing them onto the stack. Even though n is usually small (two or three), the unified treatment of all cases of n makes possible a simpler and more efficient implementation compared to previous approaches.

The WiVe algorithm is general and may be applicable to any vector architecture supporting the proper permutation and compression operations. It may also work for all branching factors in principle (practical up to BVH16).

An exemplary implementation may target BVH8 and the AVX-512(F) instruction set, which has a vector width of 512 bit for computation on 16×32-bit elements or 8×64-bit elements. At least some examples are suitable for BVH branching factors corresponding to either the full vector width or half the vector width. BVH8 implementations for both variants based on the AVX2 and AVX-512 instruction sets, respectively, are provided. Since the AVX-512 instructions map better to WiVe, the focus of some examples is on the half vector width variant (key differences for the AVX2 version are pointed out below. The AVX-512 vector registers are 512 bit in size for computation on 16×32-bit elements or 8×64-bit elements. At least some examples fully utilize the single precision floating point capabilities by computing the minimum and maximum distances of the slab test interleaved in the same vector register. In the following it is referred to 64-bit elements as node lanes and to lower and upper 32-bit elements within 64-bit elements as even and uneven lanes, respectively (FIG. 5b) The instructions key to the implementation/algorithm may be:

vpermq a, b, c: Copy 64-bit elements from c selected by the lower three bit of the 64-bit elements in b to the corresponding positions in a.

vpcompressq a{k}, b: Select 64 bit elements in b using mask k and compress the selected elements to form a continuous array aligned to the low element in a.

In the following 64-bit elements are referred to as node lanes and lower and upper 32-bit elements within 64-bit elements are referred to as even and uneven lanes, respectively (FIG. 5b).

An exemplary memory layout of a BVH8 cluster is illustrated in FIG. 5a. FIG. 5a-c show exemplary data layouts of a) a BVH8 node cluster 502 of total size 256 bytes (which corresponds to four 64 byte AVX 512 vectors). The nodes' bounding boxes may be stored as separate x-, y- and z-vectors 504, 506, 508 (with alternating max/min coordinates. A fourth vector 510 may comprise five bytes 512 for child offset and -flags (n) and three bytes 514 for permutation indices (s) per node. The fourth vector may encode the permutation vectors and the node data, which may includes a flag to indicate an inner node or a leaf, the corresponding child cluster or primitive cluster offset, a mask to identify valid nodes in a child cluster or the number of primitive clusters within a leaf. Permutation indices may be three bit in size to reference one of eight nodes, and the eight permutation vectors may be compressed into three bytes per node. b) shows a register layout for bounding box intersection. Entry ($t_{min}$) 522 and exit ($t_{max}$) 524 distances may be computed simultaneously within eight-byte lanes for each node, which may require one to treat $t_{min}$ 522 as negative. For example, the subset of nodes within the first memory may comprise and $t_{min}$ and $t_{max}$ for each node of the subset of nodes. c) shows a stack layout. Stack elements may be eight bytes in size with interleaved child offset 532 and entry distance ($t_{min}$) 534 for culling. Each nodes may take up two adjacent elements 532; 534.

The nodes' bounding boxes may be stored in a separate vector for every axis (504; 506; 508), with alternating maximum and minimum bounds. The fourth vector may contain or comprise the index vectors and the node data, which may comprise a flag to indicate an inner node or a leaf, the corresponding child cluster or primitive cluster offset, a mask to identify valid nodes in a child cluster or the number of primitive clusters within a leaf. Index vector elements may be three bit in size to reference one of eight nodes, and the eight index vectors may be compressed into three bytes per node.

Below, a pseudo code version of an example of the traverseCluster function is shown, which may be described in detail in the next paragraphs, referencing the corresponding line numbers. traverseCluster may be a core traversal function for WiVe according to an example. All local variables may be vectors with the exception of mask and num. The { } operator performs a broadcast of scalar values.

```
1   def traverseCluster(cluster , ray)
2       (bx, by, bz, node) = cluster.load( )
3       if (ray.sign.x) bx = swapEvenOdd(bx)
4       if (ray.sign.y) by = swapEvenOdd(by)
5       if (ray.sign.z) bz = swapEvenOdd(bz)
6       tx = (bx - {ray.org.x}) * {-ray.idir.x, ray.idir.x}
7       ty = (by - {ray.org.y}) * {-ray.idir.y, ray.idir.y}
8       tz = (bz - {ray.org.z}) * {-ray.idir.z, ray.idir.z}
9       t = min(tx, ty, tz, {- r.tnear, r.tfar})
10      index = shift(node, { ray . sign . xyz })
11      t = permute(t, index)
12      tmax = swapEvenOdd(t)
13      tmin = flipSign sOdd(t)
14      mask = compare(tmin, tmax)
15      node = permute(node, index)
16      elems = interleaveOddOdd(node, tmin)
17      elems = compress [mask](elems)
18      num = countBits (mask) return (elems, num)
```

For the slab test, the three bounding box vectors for the x-, y- and z-axes may be loaded into registers (line 2), so that the max/min pairs align with the node lanes, see FIG. 5a. If the sign of a ray component is negative, the corresponding max/min values may be swapped within node lanes to conform with/to the ray's point of view (lines 3-5). The swaps may be performed efficiently with masked 64-bit rotate operations, where the mask for every axis may be assumed to have been pre-computed during the ray setup phase. After swapping, the slab test (e.g. the selecting 140 of the one or more nodes) may be performed for all eight nodes in parallel (lines 6-9) computing $t_{max}$ and $t_{min}$ in even and odd lanes, respectively, based on the following four equations, utilizing full vector width, see also FIG. 5b.

$$t_{max}^{n,i} = (b_{max}^{n,i} - o^i) 31 * d^i$$

$$-t_{min}^{n,i} = (b_{min}^{n,i} - o^i) 31 * (-d^i)$$

$$t_{max}^{n} = \min_{i=x,y,z} t_{max}^{n,i}$$

$$t_{min}^{n} = \min_{i=x,y,z} -t_{min}^{n,i} \quad \text{Equation 1:}$$

Here, i and n denote the axis and the node lane, respectively, $o^i$ is a component of the ray origin, $d^i$ is the inverse component of the ray direction, and $b^{n,i}$ represent the minimum and maximum bounding box components after the initial swap. Both $o^i$ and $d^i$ may be constant throughout traversal, and the sign of the $d^{n,i} = (-1)^n d^i$ vector may be adjusted during the ray setup phase to alternate between $d^i$ and $-d^i$. Values may be further clipped to the active segment of the ray defined by $t_{near}$ and $t_{far}$. The final $t_{max}$ and $-t_{min}$ results may be laid out in the vector register as illustrated in FIG. 5b.

Next, the slab test results may be arranged using the vpermq instruction (e.g. the single processor instruction) according to the front-to-back traversal order stored in the node cluster.

The appropriate index vector may be extracted from the fourth vector shown in FIG. 5a by bit-shifting with the concatenated sign bits of the ray direction, i.e., a pre-computed three-bit value, to align the index vector's components to the lower three bits of the vector register's 64-bit elements. Following the permutation step, the $t_{max}$-$t_{min}$ pairs may be ordered such that the first node to be traversed corresponds to the last active node lane in the register.

The slab test may be completed by comparing $t_{max}$ and $t_{min}$ to retrieve the active mask, which may require the values to be in separate registers aligned to the odd lanes. This requirement may be met via a 64-bit rotate operation to form $-t_{min} t_{max}$ pairs and a sign flip with an exclusive or operation to obtain $t_{max}$ $t_{min}$ pairs. Since $t_{min} \geq 0$ always holds, the predicate of the test $t_{min} \leq t_{max}$ may be determined correctly with integer arithmetic by re-interpreting the floating-point patterns of the pairs as 64-bit signed integers.

For the stack push operation, the permutation applied to the slab test results may be repeated for the node data, which may then be interleaved with the $t_{min}$ values to form 64-bit stack elements. The stack elements may be compressed into a continuous array (e.g. the one or more nodes within the third memory region) with the vpcompressq instruction (e.g. the further single processor instruction), using the active mask, and stored to the stack, see FIG. 5c. The stack pointer may be incremented according to the number of set bits in the active mask. This method may support up to 32-bit node data. If all available 40 bits are required, it might not be possible to interleave the node data with the $t_{min}$ values. Instead, it may be compressed and stored separately on a second stack.

Primitives in the leaf nodes may be packed into primitive clusters with four primitives per cluster, which have been determined to be near-ideal for performance. Larger clusters may increase vector utilization at the cost of performing more intersection tests and increased bandwidth demand. Smaller clusters may have the inverse effect. Once traversal reaches a leaf node, the contained clusters may be tested and when an actual intersection is found the maximum ray distance $t_{far}$ may be updated accordingly. Thus, nodes on the stack with $t_{far} < t_{min}$ may be removed when such an actual intersection is found. This pruning procedure may be efficiently implemented by loading eight stack elements at a time, starting from the stack bottom, performing the comparison, and compressing and storing the remaining valid elements on the stack.

For the full vector width implementation based on AVX2 $t_{min}$ and $t_{max}$ calculations might no longer be interleaved in the same vector register. They may be performed separately instead which makes the algorithm easier to implement but may require more instructions. To support this approach, the node layout in FIG. 5 is changed to a de-interleaved format corresponding to eight 32-byte AVX2 vectors, and the combined stack may be split into separate node and $t_{min}$ stacks. Since AVX2 does not provide a compression instruction, the operation may be emulated by a permute instruction and a table look-up using the slab test mask as index. Since the mask is an 8-bit value, the table may require 256 entries. The information for a single entry may be compressed into 3 bytes (8×3 bit), encoding eight indices referencing one of eight elements. Decompression may be performed by broadcasting an entry into an AVX2 register and shifting each lane by a different amount to align the corresponding index bits.

The implementation described has been tuned for a BVH branching factor that is half the size of the vector width. However, with slight modifications a branching factor equal to the vector width may be achieved, e.g., a BVH16 using the AVX-512 instruction set. This may require slightly larger index vectors (32 bits per node), a change of the cluster memory layout, such that permutation indices and node data reside in separate vectors, and two stacks to compress and store node data and $t_{min}$ values separately.

Any-hit traversal may be used for shadow rays and may terminate as soon as an intersection with a primitive is found. For this type of query, a front-to-back order might not be important and specialized traversal orders may be more efficient. These specialized traversal orders may be identical for all rays and may be encoded into a BVH by arranging the nodes in memory accordingly. The same approach may be compatible with WiVe.

Multi-hit traversal may attempt to find the first n closest intersections with primitives along a ray. The WiVe algorithm may be compatible with multi-hit optimization techniques. Multi-hit traversal is expected to perform more efficient with WiVe compared to other approaches as limited culling possibilities in a multi-hit scenario may lead to a higher number of active children, which may reduce the performance of other approaches but not WiVe's.

WiVe Packet Traversal

Packet tracing is an efficient ray tracing technique using vector instructions for groups of coherent rays, i.e., rays that have similar origins and directions. The computational cost per ray when performing packet tracing may be significantly lower compared to single-ray traversal due to efficient vector utilization, amortization of memory access latency, node ordering and stack operations. The optimal packet size may be defined by vector width, and, when more coherent rays are available, tracing multiple packets simultaneously may be an additional benefit. Packet tracing may be combined with frustum culling, which may reduce the number of bounding box tests considerably during traversal. This section discusses the concept of augmenting packet tracing with the WiVe single ray algorithm for interval arithmetic (IA) culling. This combination may present a high-performance coherent traversal method for the BVH8, while also being applicable to other branching factors.

Applying IA to ray packets may generate intervals for the x-, y- and z-coordinates of ray origins and directions for all rays of a packet to perform a conservative rejection test for nodes outside these intervals. The slab test may be an IA operation as well, producing the $[t_{min}, t_{max}]$ interval. By expanding the definition of an origin $o_i$ and inverse direction di from points and vectors to the intervals $[\underline{o}^i, \overline{o}^i]$ and $[\underline{d}^i, \overline{d}^i]$, respectively, $t_{min}$ and $t_{max}$ may be computed conservatively for a set of rays with the following changes applied to Equation 1:

$$t_{max}^{n,i} = (b_{max}^{n,i} - \underline{o}^i) 34 * \overline{d}^i$$

$$-t_{min}^{n,i} = (b_{min}^{n,i} - \underline{o}^i) 34 * (-\overline{d}^i) \qquad \text{Equation 2:}$$

Here, it may be assumed that $(\underline{d}^i, \overline{d}^i)$ does not contain 0, i.e., all ray directions in the packet have the same sign combinations. During the set-up phase, a special interval ray may be created with maximum and negative minimum values located in the even and odd lanes, respectively, for the origin and the direction vectors. Bounding boxes missed by this interval ray may be missed by the ray packet and may be ignored.

Tracing multiple packets in parallel may require one to expand the interval ray accordingly, and one may keep track of active packets. One can use a bit mask, for which a bit is "o" when the corresponding ray packet completely misses a node during downwards traversal. When performing a stack-pop operation, the bit mask may be restored from the stack. This method may (always) intersect all active packets to keep the bit mask current. Another possibility may be to use a first packet index (FPI), initialized to the first element in the packet array. Bounding box intersection may be starting with the FPI packet, and if a valid intersection exists the remaining packets may be assumed to hit the node as well; otherwise, the FPI may be incremented until the first packet with a valid intersection is found, which may continue inner traversal, or all packets have been tested, which may trigger a stack-pop operation. An assumption may be that the number of bounding box tests can be reduced considerably when packets have high coherence (e.g. if a single packet correctly predicts the behavior of the remaining packets). Nevertheless, it may be possible that such a reduction might not be achieved, when this assumption is wrong more often than it is true, dragging uninvolved packets down the BVH. This method may be well-suited for primary rays.

These are the main steps of an algorithm representing an exemplary implementation of the method:
1. Set up ray packets, interval ray and FPI or bit mask, and define the MBVH root node as current node.
2. If the current node is a leaf, perform primitive intersection with all active ray packets and go to step 4.
3. Compute intersection of the interval ray with the current node's child cluster and place the children with valid intersections on the stack. (The stack elements may be different from those in FIG. 5c and may comprise the offset to the child data—instead of the child data—and the current FPI or bit mask—instead of $t_{min}$).
4. Perform a stack-pop operation to retrieve a new current node and restore the corresponding FPI or bit mask. The node's bounding box is broadcast into the vector registers.
5. Intersect some or all ray packets with the bounding box, and adjust the FPI or bit mask accordingly.
6. If a valid intersection is found, go to step 2; otherwise, go to step 4.

In a pseudo code implementation

```
1  def traversePackets(node, packets)
2      stack = { }
3      ray = packets.intervalRay( )
4      while ( true ) outerLoop :
5          if(node.isInner( ))
6              (elems , num) = traverseCluster ^(node. cluster , ray)
7              stack .push(elems, num)
8          else
9              intersectLeaf(node, packets)
10         while ( true )
11             if ( stack.isEmpty ( ) ) return
12             (node, fpi) = stack.pop( )
13             packets .setNext(fpi)
14             do
15                 if(intersect(node, packets.current( ))
16                     goto outerLoop
17             while (packets . next ( ) )
```

The input variable packets may be a list containing one or more ray packets (line 1). The interval ray may be calculated (line 3) to enclose all rays within the packets. If the current node points to a node cluster the traverseCluster function defined above may be performed on the interval ray (line 6) and the sorted list of active elements may be stored to the stack (line 7). The function is slightly modified in the sense that it may return different stack elements compared to those illustrated in FIG. 5c. Instead of a direct reference to the child cluster, a reference to the parent node may be stored, along with the current FPI. The $t_{min}$ value might not be required. If the current node points to a primitive cluster, primitive intersection may be performed (line 9). The following loop (line 10) may repeatedly pop the stack to retrieve a new node (line 12) until either the stack is empty (line 11) or a valid packet intersection exists (line 16). The setNext method (line 13) may restore the current FPI from the stack, the current method (line 15) may return the packet pointed to by the FPI, and the next method (line 17) may advance the FPI to the next packet. If only a single packet is traversed, lines 13, 14 and 17 might be omitted.

The addition of the WiVe single-ray algorithm to the standard packet traversal approach may lead to two improvements: First, the number of bounding box intersections may be reduced significantly via IA culling. Second, front-to-back traversal may be done implicitly through the stack. The result may be a simple and highly efficient technique for multi-branching BVH packet traversal.

The ray traversal algorithm has been evaluated by generating performance data based on a AVX-512 implementation on the Intel® Xeon™ Phi 7250 @1.4 GHz (KNL). The results ware compared with those obtained with Intel Embree 2.15.0 and Nvidia OptiX Prime 4.0.1, high-performance ray tracing libraries for CPUs and GPUs, respectively. In order to ensure comparability of performance data, the code was integrated into the open source Intel Embree benchmark suite Protoray, which offers Embree and OptiX Prime kernels. Embree constructs a native BVH8, which might not be directly converted to the layout used in exemplary embodiments, since the exemplary algorithm may be required to know the intermediate split history to extract the permutation vectors. Therefore, a custom BVH8 was generated, implying that the traversal algorithm is no longer solely responsible for the observed performance differences. However, a comparison can be performed to the distance heuristic implementation that may be otherwise identical to the implementation of the proposed algorithm. The performance evaluation may be based on five scenes comprising between 5.7M and 37.5M triangles. On the KNL, these benchmarks were processed by all 272 Threads, with all data allocated in the high-bandwidth MCDRAM memory segment. The on-chip mesh network was configured in quadrant mode. The OptiX results are cited from Intel, obtained via the Protoray framework using identical settings on a Nvidia Titan X (Pascal).

The key comparison between distance and sign heuristics may compare how well they approximate a front-to-back traversal order to maximize node culling, see the table shown in FIG. 6a. FIG. 6a shows Traversal statistics for the sign-based WiVe algorithm, a distance-based reference implementation and Embree. The columns Inner Nodes, Leaves and Triangles list the per-ray average numbers of inner nodes visited, leaves intersected, and triangles intersected, respectively. The three per-ray average indicators (inner nodes visited, leaves intersected, and triangles intersected) were very close to being equal across the scenes, with a slight bias towards the distance heuristic. A notable discrepancy may be observed for SanMiguel, where the number of intersected leaves and triangles is up 6-7% for the sign heuristic, which may be attributed to the high degree of overlap of the alpha-textured leaf triangles.

In such a setting, the distance heuristic may be more precise as it considers the actual intersection point of the ray. The data for Embree are lower for most scenes, which may be a consequence of the difference in BVH8 quality between the exemplary implementation according to embodiments and Embree's fine-tuned native BVH8 builder. For identical hierarchies, the distance heuristic according to embodiments and Embree may result in exactly the same traversal operations. The SAH costs provided for Embree indicate, that the Embree SAH cost for inner nodes may be (always) smaller compared the custom BVH8's, whereas the triangles in the exemplary embodiment may be bounded more tightly, probably at the expense of increased node overlap. The discrepancy in BVH8 quality may be kept in mind when assessing the performance results provided in the table of FIG. 6b.

FIG. 6b provides performance data measured in million-rays per second (MRay/s) for a basic diffuse path tracer with up to eight bounces per sample. When comparing the sign-based WiVe traversal to the distance-based reference implementation, a substantial speed-up of between 27% and 67% may be observed across all scenes.

The increased efficiency may originate from the inner node traversal phase since other parts share the same implementation. This may imply that the reduced code complexity due to the novel algorithm may be the (only) significant differentiating factor. Variance in memory access patterns due to slight differences in traversal order between the two heuristics may be negligible, which may follow from the nearly identical data listed in FIG. 6a. The algorithm of the exemplary embodiment may be especially advantageous when rays frequently overlap with more than two children during a traversal step, e.g., in the Powerplant scene.

The resulting performance data are shown in the table of FIG. 6c. FIG. 6c shows Distribution of numbers of valid child intersections (in percent) for a single traversal step. In this case, the sign heuristic may require increasingly expensive sorting and stack operations while the algorithm of exemplary embodiments' execution may be independent of the number of active children. The comparison to Embree may be somewhat biased due to Embree's highly optimized BVH8 structure affecting several other factors, such as the number of traversal operations per ray and memory access patterns. Still, the algorithm of the exemplary embodiment may consistently out-perform the Embree kernel by between 11% and 38%. Assuming an equal BVH8 structure and a faster implementation of the distance heuristic in Embree when compared to the reference, it may be assumed that the efficiency gains of the algorithm over Embree lie between the two measured distance-based values. OptiX runs on an Nvidia Titan X using specialized ray tracing kernels for the GPU, which makes a comparison of OptiX and the method of examples a comparison of hardware platforms, not algorithms. However, the algorithm according to embodiments may be particularly well-suited for GPU-like architectures and may improve OptiX performance.

Finally, performance comparison data may be provided for the WiVe Packet traversal with Embree's hybrid traversal for primary rays in FIG. 6d, showing a significant and consistent speed-up of between 88% and 145% across all scenes. The culling statistics shown in the table of FIG. 6d may indicate that the frustum ray avoids between 73% and 82% of all node intersection tests, partly explaining these impressive results. FIG. 6d shows Performance in million-rays per second (MRays/s) for the WiVe Packet algorithm and Embree's hybrid traversal.

An image is rendered at a resolution of 3840×2160 pixels using primary rays. The other important aspect, again, may be reduced code complexity resulting from the integrated culling and ordering technique. In at least some embodiments, only a single ray packet may be traced at a time, for which conventional culling implementations may pose a significant overhead. High image resolution was chosen, which may favor frustum culling methods due to high ray coherence. Less coherence would reduce culling efficiency and speed-up accordingly. However, this may be true for packet tracing in general.

FIG. 6e shows SAH costs for the BVH8s produced by the implementation according to embodiments and Embree, separated by inner node and leaf costs. Both implementations use SAH-based binning with 16 bins.

In the past, the multi-branching bounding volume hierarchy led to the last major performance gain in single ray traversal, by utilizing vector instructions for bounding box tests. At least some examples may provide the formulation of an innovative, fully vectorized traversal algorithm by introducing the WiVe algorithm. The efficiency gain obtained by WiVe may be made possible by transforming node ordering and stack-push operations from conditional scalar execution paths to constant-time vector operations, making them ideal for current and future massively parallel micro architectures. Furthermore, WiVe Packet has been introduced to accelerate traversal of coherent ray packets, using the WiVe methodology. Performance gains resulting from the algorithm have been demonstrated by implementing it for the AVX-512 instruction set. The performance data document that the exemplary algorithm outperforms an industry-leading ray tracing library, Embree ray tracing, by between 11% and 38%, and by between 88% and 145% on the Intel® Knights Landing CPU. WiVe promises to accelerate single ray traversal for multi-branching bounding volume hierarchies on the GPU as well.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for an ordered traversal of a subset of nodes of a tree structure, the method comprising
obtaining ordering information indicating a desired order of the ordered traversal of the tree structure;
selecting a predetermined ordering parameter template from a plurality of predetermined ordering parameter templates based on the ordering information; and
copying the subset of nodes of the tree structure from a first memory region to a second memory region using a single processor operation of a vector processing processor instruction set such that the subset of nodes of the tree structure is stored within the second memory region in the desired order, wherein the selected predetermined ordering parameter template is used as a parameter for the single processor operation.

2. The method according to claim 1, wherein the ordering information indicates a query order index, and wherein the predetermined parameter template assigned to the desired order of the ordered traversal of the tree structure is retrieved using the query order index of said desired order.

3. The method according to claim 1, wherein the ordering information indicates k binary ordering parameters related to k degrees of freedom for the order of the tree structure, wherein the selecting selects the corresponding predetermined ordering parameter template from a plurality of k! predetermined ordering parameter templates, wherein the k! predetermined ordering parameter templates are based on the k binary ordering parameters.

4. The method according to claim 3, wherein the plurality of k! predetermined ordering parameter templates are represented by fewer than k! bit vectors based on inversion symmetry between predetermined ordering parameter templates of the plurality of k! predetermined ordering parameter templates.

5. The method according to claim 1, wherein the desired ordering of the ordered traversal is with respect to a directional query.

6. The method according to claim 5, wherein the directions of the directional query are quantized to a set of m possible directions, wherein each of the m possible directions is assigned a predetermined parameter template of the plurality of predetermined parameter templates, and wherein the plurality of predetermined parameter templates is specific for the subset of nodes.

7. The method according to claim 6, wherein each of the m possible directions has a query order index, and wherein the predetermined parameter template assigned to a direction of the m possible directions is retrieved using the query order index of said direction.

8. The method according to claim 6, wherein the directional query is related to a ray of a raytracing calculation, wherein the m possible directions corresponds to a set of $2^n$ quantized directions in n-dimensional space, and wherein the desired ordering of the ordered traversal is with respect to a direction of the ray of the raytracing application.

9. The method according to claim 5, wherein a direction of a directional query is defined by a point on an n-dimensional sphere, wherein the tree structure is embedded into an n-dimensional space, and wherein the desired order of the tree structure is defined by the direction of the directional query.

10. The method according to claim 1, wherein the tree structure is characterized by a branching factor f, and
wherein the subset of nodes are nodes that are child node to the same parent node of the tree structure,
and/or wherein the size of the subset of nodes is at least 2 and at most f,
and/or wherein a predetermined ordering parameter template of the plurality of predetermined ordering parameter templates is a set of f parameters that define an ordering permutation of the subset of nodes.

11. The method according to claim 1, wherein the single processor operation is a vector permute operation.

12. The method according to claim 1, wherein the subset of nodes is a subset of the nodes of the tree structure presently traversed by the method.

13. The method according to claim 1 further comprising:
choosing one or more nodes of the subset of nodes based on a selection criterion using a vector comparison operation;
determining a compaction parameter of a further single processor operation of the vector processing processor instruction set based on the chosen one or more nodes, wherein the further single processor operation is a vector compaction operation; and
copying the one or more nodes from the second memory region to a third memory region using the further single processor operation and the compaction parameter such that the one or more nodes are stored adjacently within the third memory region.

14. The method according to claim 13, wherein the one or more nodes are chosen based on an intersection of a ray of a raytracing calculation with a node of the subset of nodes.

15. The method according to claim 13, wherein the tree structure comprises a plurality of nodes, wherein the plurality of nodes represents a plurality of objects of a scene of a raytracing calculation.

16. The method according to claim 13 further comprising selecting one or more subsets of nodes to be processed from the tree structure based on the one or more chosen nodes and repeating the method by successively using the one or more subsets of nodes to be processed as the subset of nodes.

17. The method according to claim 1, wherein the tree structure is based on a bounding volume hierarchy, and wherein the nodes of the tree structure represent bounding boxes of objects within a scene of a raytracing calculation.

18. A method for determining an occlusion of a point along a ray in a raytracing scene, wherein the raytracing scene comprises a plurality of objects, wherein the plurality of objects are represented by a plurality of nodes of a tree structure, the method comprising:
determining a direction of the ray;
traversing the tree structure using a method for an ordered traversal of a subset of nodes of a tree structure, by:
obtaining ordering information indicating a desired order of the ordered traversal of the tree structure,
selecting a predetermined ordering parameter template from a plurality of predetermined ordering parameter templates based on the ordering information, copying the subset of nodes of the tree structure from a first memory region to a second memory region using a single processor operation of a vector processing processor instruction set such that the subset of nodes of the tree structure is stored within the second memory region in the desired order, wherein the selected predetermined ordering parameter template is used as a parameter for the single processor operation,
choosing one or more nodes of the subset of nodes based on a selection criterion using a vector comparison operation,
determining a compaction parameter of a further single processor operation of the vector processing processor instruction set based on the chosen one or more nodes, wherein the further single processor operation is a vector compaction operation, and copying the one or more nodes from the second memory region to a third memory region using the further single processor operation and the compaction parameter such that the one or more nodes are stored adjacently within the third memory region,
wherein the desired ordering of the ordered traversal is with respect to a direction of the ray,
wherein a first subset of nodes of the tree structure to be processed as the subset of nodes is chosen from a root of the tree structure, wherein subsequent subsets of nodes to be processed as the subset of nodes are chosen based on the one or more chosen nodes, wherein the selection criterion to be used is, whether the ray intersects a bounding box associated with a node of the subset of nodes, and wherein leaf nodes among the chosen one or more nodes are added to a plurality of intersecting leaf nodes; and determining the occlusion of the point along the ray based on the plurality of intersecting leaf nodes.

19. The method according to claim 18, wherein the tree structure is traversed using a depth-first manner, or wherein the tree structure is traversed using a breadth-first manner.

20. A computer program having a program code for performing a method for an ordered traversal of a subset of nodes of a tree structure when the computer program is executed on a computer, a processor, or a programmable hardware component, the method comprising:

obtaining ordering information indicating a desired order of the ordered traversal of the tree structure;

selecting a predetermined ordering parameter template from a plurality of predetermined ordering parameter templates based on the ordering information; and copying the subset of nodes of the tree structure from a first memory region to a second memory region using a single processor operation of a vector processing processor instruction set such that the subset of nodes of the tree structure is stored within the second memory region in the desired order, wherein the selected predetermined ordering parameter template is used as a parameter for the single processor operation.

* * * * *

UNITED STATES PATENT AND TRADEMARK OFFICE
CERTIFICATE OF CORRECTION

PATENT NO.         : 10,482,650 B2
APPLICATION NO.    : 15/814441
DATED              : November 19, 2019
INVENTOR(S)        : Valentin Futterling It is certified that error appears in the above-identified patent and that said Letters Patent is hereby corrected as shown below:

In the Claims

Column 31, Line 15 (Claim 20) should read as "A computer program stored in a non-transitory storage medium having a program code for"

Signed and Sealed this
Fifth Day of May, 2020

Andrei Iancu
*Director of the United States Patent and Trademark Office*